United States Patent
Zhou et al.

(10) Patent No.: US 10,304,326 B2
(45) Date of Patent: May 28, 2019

(54) TERMINAL HAVING INFRARED REMOTE CONTROL FUNCTION AND PAIRING METHOD FOR INFRARED REMOTE CONTROL

(71) Applicant: Huawei Technologies Co., Ltd., Shenzhen (CN)

(72) Inventors: Jinhua Zhou, Shanghai (CN); Chenfei Xiong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 15/535,253

(22) PCT Filed: Oct. 28, 2015

(86) PCT No.: PCT/CN2015/093095
§ 371 (c)(1),
(2) Date: Jun. 12, 2017

(87) PCT Pub. No.: WO2016/091023
PCT Pub. Date: Jun. 16, 2016

(65) Prior Publication Data
US 2017/0323560 A1    Nov. 9, 2017

(30) Foreign Application Priority Data
Dec. 11, 2014  (CN) .......................... 2014 1 0776677

(51) Int. Cl.
*G08C 17/02* (2006.01)
*G08C 23/04* (2006.01)
*H04B 10/116* (2013.01)

(52) U.S. Cl.
CPC ............. *G08C 23/04* (2013.01); *G08C 17/02* (2013.01); *H04B 10/116* (2013.01);
(Continued)

(58) Field of Classification Search
CPC ... H04B 10/114–10/1149; G08C 23/02; G08C 2201/00–2201/94
See application file for complete search history.

(56) References Cited

U.S. PATENT DOCUMENTS

| | | |
|---|---|---|
| 4,959,810 A | 9/1990 | Darbee et al. |
| 2012/0068833 A1 | 3/2012 | Rothkopf et al. |

(Continued)

FOREIGN PATENT DOCUMENTS

| | | |
|---|---|---|
| CN | 200953187 Y | 9/2007 |
| CN | 101702261 A | 5/2010 |

(Continued)

OTHER PUBLICATIONS

Foreign Communication From A Counterpart Application, European Application No. 15867453.1, Partial Supplementary European Search Report dated Oct. 26, 2017, 12 pages.
(Continued)

*Primary Examiner* — Casey L Kretzer
(74) *Attorney, Agent, or Firm* — Conley Rose, P.C.

(57) ABSTRACT

A terminal having an infrared remote control function and a pairing method for infrared remote control, where in the terminal, a memory stores an infrared code library, a processor selects an infrared code from the infrared code library, an infrared transmitter sends an infrared signal to a to-be-remotely-controlled device according to the infrared code, a sensor senses a status change of the to-be-remotely-controlled device that occurs after the to-be-remotely-controlled device receives the infrared signal, and the processor determines, according to the status change of the to-be-remotely-controlled device sensed by the sensor, whether the terminal successfully establishes a pairing with the to-be-remotely-controlled device. Therefore, the terminal automatically establishes the pairing with the to-be-remotely-controlled device, and an automation degree of a pairing process during intelligent remote control is improved.

8 Claims, 6 Drawing Sheets

(52) U.S. Cl.
CPC ..... *G08C 2201/20* (2013.01); *G08C 2201/51* (2013.01); *G08C 2201/71* (2013.01); *G08C 2201/91* (2013.01); *G08C 2201/93* (2013.01)

(56) References Cited

U.S. PATENT DOCUMENTS

| | | | |
|---|---|---|---|
| 2012/0068857 | A1 | 3/2012 | Rothkopf et al. |
| 2012/0169939 | A1* | 7/2012 | Kim ................. G08C 19/28 348/734 |
| 2014/0105397 | A1 | 4/2014 | Ikeda et al. |
| 2014/0355993 | A1 | 12/2014 | Tang |
| 2016/0073151 | A1* | 3/2016 | Keller .............. H04N 21/42208 348/734 |

FOREIGN PATENT DOCUMENTS

| | | |
|---|---|---|
| CN | 102280022 A | 12/2011 |
| CN | 102779400 A | 11/2012 |
| CN | 102938818 A | 2/2013 |
| CN | 103221986 A | 7/2013 |
| CN | 103325234 A | 9/2013 |
| CN | 103440760 A | 12/2013 |
| CN | 103544830 A | 1/2014 |
| CN | 103942938 A | 7/2014 |
| CN | 104184971 A | 12/2014 |
| EP | 1510896 A1 | 3/2005 |
| JP | H09224293 A | 8/1997 |
| JP | 2007235613 A | 9/2007 |
| JP | 4413100 B2 | 2/2010 |

OTHER PUBLICATIONS

Machine Translation and Abstract of Chinese Publication No. CN101702261, May 5, 2010, 6 pages.
Machine Translation and Abstract of Chinese Publication No. CN102938818, Feb. 20, 2013, 8 pages.
Machine Translation and Abstract of Chinese Publication No. CN103440760, Dec. 11, 2013, 7 pages.
Machine Translation and Abstract of Chinese Publication No. CN103942938, Jul. 23, 2014, 19 pages.
Machine Translation and Abstract of Chinese Publication No. JPH09224293, Aug. 26, 1997, 24 pages.
Foreign Communication From A Counterpart Application, PCT Application No. PCT/CN2015/093095, English Translation of International Search Report dated Jan. 13, 2016, 3 pages.
Foreign Communication From A Counterpart Application, PCT Application No. PCT/CN2015/093095, English Translation of Written Opinion dated Jan. 13, 2016, 7 pages.
Foreign Communication From A Counterpart Application, European Application No. 15867453.1, Extended European Search Report dated Jan. 17, 2018, 11 pages.
Machine Translation and Abstract of Chinese Publication No. CN102280022, Dec. 14, 2011, 22 pages.
Machine Translation and Abstract of Chinese Publication No. CN102779400, Nov. 14, 2012, 6 pages.
Machine Translation and Abstract of Chinese Publication No. CN103325234, Sep. 25, 2013, 15 pages.
Machine Translation and Abstract of Chinese Publication No. CN103544830, Jan. 29, 2014, 16 pages.
Machine Translation and Abstract of Chinese Publication No. CN200953187, Sep. 26, 2007, 5 pages.
Foreign Communication From A Counterpart Application, Chinese Application No. 201410776677.4, Chinese Office Action dated Jul. 3, 2018, 10 pages.
Machine Translation and Abstract of Japanese Publication No. JP2007235613, Sep. 13, 2007, 15 pages.
Foreign Communication From A Counterpart Application, Japanese Application No. 2017-530703, Japanese Office Action dated Sep. 10, 2018, 2 pages.
Foreign Communication From A Counterpart Application, Japanese Application No. 2017-530703, English Translation of Japanese Office Action dated Sep. 10, 2018, 4 pages.

* cited by examiner

TERMINAL HAVING INFRARED REMOTE CONTROL FUNCTION AND PAIRING METHOD FOR INFRARED REMOTE CONTROL

CROSS-REFERENCE TO RELATED APPLICATIONS

This application is a U.S. National Stage of International Patent Application No. PCT/CN2015/093095 filed on Oct. 28, 2015, which claims priority to Chinese Patent Application No. CN 201410776677.4 filed on Dec. 11, 2014, which are incorporated herein by reference in their entireties.

TECHNICAL FIELD

The present disclosure relates to remote control technologies, and in particular, to a terminal having an infrared remote control function and a pairing method for infrared remote control.

BACKGROUND

More and more mobile phones have an infrared module or may be provided with an infrared module using an interface. The infrared module is a hardware circuit combination having a function of connecting to another control device and an infrared remote control function, and includes an infrared emitter, a drive circuit, and a communications circuit. A mobile phone may serve as a remote control using an infrared module in order to remotely control a television, an air conditioner, and the like.

Usually, a mobile phone initially has no remote control function, and can remotely control a to-be-remotely-controlled device only after establishing a pairing with the device. Generally, a pairing process includes the following steps.

Step 1: A user enters a model or a brand of a to-be-remotely-controlled device on a mobile phone.

Step 2: Select, according to the model or the brand entered by the user, an infrared code from an infrared code library stored in the mobile phone.

Step 3: Encode an infrared signal according to the selected infrared code, and send the encoded infrared signal to the to-be-remotely-controlled device.

Step 4: When the to-be-remotely-controlled device responds correctly, the user determines that matching succeeds. Otherwise, go back to step 1 to repeat the pairing process of step 1 to step 4.

A disadvantage of the pairing process includes that a user needs to manually enter a model or a brand of a device, and needs to manually determine whether matching succeeds, which results in a low automation degree.

SUMMARY

Embodiments of the present disclosure provide a terminal having an infrared remote control function and a pairing method for infrared remote control in order to provide a solution for automatically establishing a pairing with a to-be-remotely-controlled device, and improve an automation degree of a pairing process during intelligent remote control.

According to a first aspect, an embodiment of the present disclosure provides a terminal having an infrared remote control function, including a memory configured to store an infrared code library, a processor configured to select an infrared code from the infrared code library stored in the memory, an infrared transmitter configured to send an infrared signal to a to-be-remotely-controlled device according to the infrared code selected by the processor, and a sensor configured to sense a status change of the to-be-remotely-controlled device that occurs after the to-be-remotely-controlled device receives the infrared signal after the infrared transmitter sends the infrared signal, where the processor is further configured to determine, according to the status change of the to-be-remotely-controlled device that is sensed by the sensor, whether the terminal successfully establishes a pairing with the to-be-remotely-controlled device.

With reference to the first aspect, in a first possible implementation manner, the terminal further includes a rotation apparatus, where the rotation apparatus is configured to drive the terminal to rotate in a horizontal direction and a vertical direction under the control of the processor. The processor is further configured to determine spatial angle coordinates of the to-be-remotely-controlled device relative to the terminal before the infrared transmitter emits the infrared signal to the to-be-remotely-controlled device, and control the rotation apparatus to rotate the terminal according to the determined spatial angle coordinates such that the infrared signal sent by the terminal points to the to-be-remotely-controlled device, and after the rotation apparatus rotates the to-be-remotely-controlled device such that the infrared signal sent by the terminal points to the to-be-remotely-controlled device, the processor is further configured to control the infrared transmitter to send the infrared signal to the to-be-remotely-controlled device according to the infrared code selected by the processor.

With reference to the first possible implementation manner of the first aspect, in a second possible implementation manner, the sensor includes a camera, and the processor is further configured to control the camera to separately take a picture every preset time interval, every preset horizontal angle and vertical angle, or at multiple preset spatial angles in a process in which the rotation apparatus drives the terminal to rotate, record a pitch angle and a horizontal angle of the terminal at which the picture is taken corresponding to each picture taken by the camera, determine a picture of the to-be-remotely-controlled device from pictures taken by the camera, and determine, from the determined picture of the to-be-remotely-controlled device, a picture in which the to-be-remotely-controlled device is in the center, and set a recorded pitch angle and horizontal angle of the terminal that correspond to the picture in which the to-be-remotely-controlled device is in the center as the spatial angle coordinates of the to-be-remotely-controlled device relative to the terminal.

With reference to the second possible implementation manner of the first aspect, in a third possible implementation manner, the memory is further configured to store an appearance characteristic value of the to-be-remotely-controlled device, and the processor is further configured to extract an appearance characteristic value of a photographed object in each picture taken by the camera, compare the extracted appearance characteristic value with the appearance characteristic value of the to-be-remotely-controlled device that is stored in the terminal, and set a picture whose appearance characteristic value of a photographed object is consistent with the stored appearance characteristic value of the to-be-remotely-controlled device as the picture of the to-be-remotely-controlled device.

With reference to the first aspect, in a fourth possible implementation manner, the processor is further configured to receive operation sensing information sent by the sensor, where the operation sensing information is information obtained by the sensor according to the sensed status change of the to-be-remotely-controlled device that occurs after the to-be-remotely-controlled device receives the infrared signal, determine the status change of the to-be-remotely-controlled device according to the operation sensing information, and determine that the terminal successfully establishes a pairing with the to-be-remotely-controlled device when the determined status change of the to-be-remotely-controlled device is consistent with an operation indicated by the infrared signal, or determine that the terminal fails to establish a pairing with the to-be-remotely-controlled device when the determined status change of the to-be-remotely-controlled device is inconsistent with an operation indicated by the infrared signal.

With reference to the fourth possible implementation manner of the first aspect, in a fifth possible implementation manner, the sensor includes a sound sensor and/or a camera.

According to a second aspect, an embodiment of the present disclosure provides a terminal having an infrared remote control function, including a processor, an infrared transmitter, and a rotation apparatus, where the rotation apparatus is configured to under the control of the processor, drive the terminal to rotate in a horizontal direction and a vertical direction. The infrared transmitter is configured to emit an infrared signal to a to-be-remotely-controlled device under the control of the processor, and the processor is configured to determine spatial angle coordinates of each to-be-remotely-controlled device in to-be-remotely-controlled devices surrounding the terminal relative to the terminal in a process of controlling the rotation apparatus to drive the terminal to rotate, and control, for each determined set of spatial angle coordinates, the rotation apparatus to rotate the terminal according to the spatial angle coordinates such that the infrared signal sent by the terminal points to a to-be-remotely-controlled device at the spatial angle coordinates, and then control the infrared transmitter to send the infrared signal to the to-be-remotely-controlled device such that the terminal establishes a pairing with the to-be-remotely-controlled device.

With reference to the second aspect, in a first possible implementation manner, the terminal further includes a camera, and the processor is further configured to control the camera to separately take a picture every preset time interval, every preset horizontal angle and vertical angle, or at multiple preset spatial angles in a process in which the rotation apparatus drives the terminal to rotate, corresponding to each picture taken by the camera, record a pitch angle and a horizontal angle of the terminal at which the picture is taken, determine a picture of each to-be-remotely-controlled device from pictures taken by the camera, and for each to-be-remotely-controlled device, determine, from the picture of the to-be-remotely-controlled device, a picture in which the to-be-remotely-controlled device is in the center, and for each to-be-remotely-controlled device, set a recorded pitch angle and horizontal angle of the terminal that correspond to the picture in which the to-be-remotely-controlled device is in the center as spatial angle coordinates of the to-be-remotely-controlled device relative to the terminal.

With reference to the first possible implementation manner of the second aspect, in a second possible implementation manner, the terminal further includes a memory, where the memory is configured to store appearance characteristic values of devices that can be remotely controlled in an infrared manner, and the processor is further configured to extract an appearance characteristic value of a photographed object in the picture for each picture taken by the camera, and compare the extracted appearance characteristic value of the photographed object in the picture with the appearance characteristic values, stored in the memory, of the devices that can be remotely controlled in an infrared manner, and set a picture whose appearance characteristic value of a photographed object is consistent with a stored appearance characteristic value of the photographed object as the picture of the to-be-remotely-controlled device.

With reference to the second possible implementation manner of the second aspect, in a third possible implementation manner, after setting the picture whose appearance characteristic value of a photographed object is consistent with a stored appearance characteristic value of the photographed object as the picture of the to-be-remotely-controlled device, and before controlling, for each determined set of spatial angle coordinates, the infrared transmitter to send an infrared signal to the to-be-remotely-controlled device at the spatial angle coordinates in order to establish a pairing with the to-be-remotely-controlled device, the processor is further configured to determine a type of the to-be-remotely-controlled device in the picture according to an appearance characteristic value of a photographed object in the picture whose appearance characteristic value of a photographed object is consistent with a stored appearance characteristic value of the photographed object. The memory is further configured to store an infrared code library, and the processor is further configured to select, for each determined set of spatial angle coordinates, according to a type of the to-be-remotely-controlled device at the spatial angle coordinates, an infrared code from the infrared code library stored in the memory, and control, according to the selected infrared code, the infrared transmitter to send an infrared signal to the to-be-remotely-controlled device such that the terminal establishes a pairing with the to-be-remotely-controlled device.

With reference to the second aspect, in a fourth possible implementation manner, the terminal further includes a sensor, where the sensor is configured to sense an operation of an object surrounding the terminal, and after controlling, for each determined set of spatial angle coordinates, the infrared transmitter to send the infrared signal to the to-be-remotely-controlled device at the spatial angle coordinates, the processor is further configured to control the sensor to sense a status change of the to-be-remotely-controlled device that occurs after the to-be-remotely-controlled device receives the infrared signal, and determine, according to the status change of the to-be-remotely-controlled device that is sensed by the sensor, whether the terminal successfully establishes a pairing with the to-be-remotely-controlled device.

With reference to the fourth possible implementation manner of the second aspect, in a fifth possible implementation manner, the processor is further configured to receive operation sensing information sent by the sensor, where the operation sensing information is information obtained by the sensor according to the sensed status change of the to-be-remotely-controlled device that occurs after the to-be-remotely-controlled device receives the infrared signal, determine the status change of the to-be-remotely-controlled device according to the operation sensing information, and determine that the terminal successfully establishes a pairing with the to-be-remotely-controlled device when the determined status change of the to-be-remotely-controlled device is consistent with an operation indicated by the infrared signal, or determine that the terminal fails to establish a pairing with the to-be-remotely-controlled device when the determined status change of the to-be-remotely-controlled device is inconsistent with an operation indicated by the infrared signal.

With reference to the fifth possible implementation manner of the second aspect, in a sixth possible implementation manner, the sensor includes a sound sensor and/or a camera.

According to a third aspect, an embodiment of the present disclosure provides a pairing method for infrared remote control of a terminal having an infrared remote control function, including selecting, by the terminal, an infrared code from an infrared code library stored in the terminal, sending, by the terminal, an infrared signal to a to-be-remotely-controlled device according to the selected infrared code, sensing, by the terminal using a sensor of the terminal, a status change of the to-be-remotely-controlled device that occurs after the to-be-remotely-controlled device receives the infrared signal, and determining, by the terminal according to the status change of the to-be-remotely-controlled device that is sensed by the sensor, whether the terminal successfully establishes a pairing with the to-be-remotely-controlled device.

With reference to the third aspect, in a first possible implementation manner, the terminal includes a rotation apparatus configured to drive the terminal to rotate in a horizontal direction and a vertical direction, and before selecting, by the terminal, an infrared code for a to-be-remotely-controlled device from an infrared code library stored in the terminal, the method further includes determining, by the terminal, spatial angle coordinates of the to-be-remotely-controlled device relative to the terminal, and sending, by the terminal, an infrared signal to a to-be-remotely-controlled device according to the selected infrared code includes controlling, by the terminal, the rotation apparatus to rotate the terminal according to the determined spatial angle coordinates such that the infrared signal sent by the terminal points to the to-be-remotely-controlled device.

With reference to the first possible implementation manner of the third aspect, in a second possible implementation manner, determining, by the terminal, spatial angle coordinates of the to-be-remotely-controlled device relative to the terminal includes controlling, by the terminal, the rotation apparatus to drive the terminal to rotate in a horizontal direction and a vertical direction, separately taking a picture every preset time interval, every preset horizontal angle and vertical angle, or at multiple preset spatial angles in a rotation process, and for each taken picture, recording a pitch angle and a horizontal angle of the terminal at which the picture is taken, determining, by the terminal, a picture of the to-be-remotely-controlled device from taken pictures, and determining, from the determined picture of the to-be-remotely-controlled device, a picture in which the to-be-remotely-controlled device is in the center, and setting, by the terminal, a recorded pitch angle and horizontal angle of the terminal that correspond to the picture in which the to-be-remotely-controlled device is in the center as the spatial angle coordinates of the to-be-remotely-controlled device relative to the terminal.

With reference to the second possible implementation manner of the third aspect, in a third possible implementation manner, determining, by the terminal, a picture of the to-be-remotely-controlled device from taken pictures includes extracting, by the terminal, an appearance characteristic value of a photographed object in each taken picture, comparing the extracted appearance characteristic value with an appearance characteristic value of the to-be-remotely-controlled device that is stored in the terminal, and setting a picture whose appearance characteristic value of a photographed object is consistent with the stored appearance characteristic value of the to-be-remotely-controlled device as the picture of the to-be-remotely-controlled device.

With reference to the third aspect, in a fourth possible implementation manner, determining, by the terminal according to the sensed status change of the to-be-remotely-controlled device, whether the terminal successfully establishes a pairing with the to-be-remotely-controlled device includes determining, by the terminal, the status change of the to-be-remotely-controlled device according to the operation sensing information, where the operation sensing information is information obtained by the sensor according to the sensed status change of the to-be-remotely-controlled device that occurs after the to-be-remotely-controlled device receives the infrared signal, and determining, by the terminal, that the terminal successfully establishes a pairing with the to-be-remotely-controlled device when the determined status change of the to-be-remotely-controlled device is consistent with an operation indicated by the infrared signal, or determining, by the terminal, that the terminal fails to establish a pairing with the to-be-remotely-controlled device when the determined status change of the to-be-remotely-controlled device is inconsistent with an operation indicated by the infrared signal.

With reference to the fourth possible implementation manner of the third aspect, in a fifth possible implementation manner, the sensor includes a sound sensor and/or a camera.

According to a fourth aspect, an embodiment of the present disclosure provides a pairing method for infrared remote control of a terminal having an infrared remote control function, where the terminal includes a rotation apparatus configured to drive the terminal to rotate in a horizontal direction and a vertical direction, and the method includes in a process of controlling the rotation apparatus to drive the terminal to rotate, determining, by the terminal, spatial angle coordinates of each to-be-remotely-controlled device in to-be-remotely-controlled devices surrounding the terminal relative to the terminal, and controlling, by the terminal for each determined set of spatial angle coordinates, the rotation apparatus to rotate the terminal according to the spatial angle coordinates such that an infrared signal sent by the terminal points to a to-be-remotely-controlled device at the spatial angle coordinates, and then sending the infrared signal to the to-be-remotely-controlled device at the spatial angle coordinates in order to establish a pairing with the to-be-remotely-controlled device.

With reference to the fourth aspect, in a first possible implementation manner, determining, by the terminal, spatial angle coordinates of each to-be-remotely-controlled device in to-be-remotely-controlled devices surrounding the terminal relative to the terminal includes controlling, by the terminal, the rotation apparatus to drive the terminal to rotate in a horizontal direction and a vertical direction, separately taking a picture every preset time interval, every preset horizontal angle and vertical angle, or at multiple preset spatial angles in a rotation process, and for each taken picture, recording a pitch angle and a horizontal angle of the terminal at which the picture is taken, determining, by the terminal, a picture of each to-be-remotely-controlled device from taken pictures, and for each to-be-remotely-controlled device, and determining, from the picture of the to-be-remotely-controlled device, a picture in which the to-be-remotely-controlled device is in the center, and for each to-be-remotely-controlled device, setting, by the terminal, a recorded pitch angle and horizontal angle that correspond to the picture in which the to-be-remotely-controlled device is in the center as the spatial angle coordinates of the to-be-remotely-controlled device relative to the terminal.

With reference to the first possible implementation manner of the fourth aspect, in a second possible implementation manner, determining, by the terminal, a picture of each to-be-remotely-controlled device from taken pictures includes extracting, by the terminal, for each taken picture, an appearance characteristic value of a photographed object in the picture, and comparing, by the terminal, the extracted appearance characteristic value of the photographed object in the picture with an appearance characteristic value, stored in the terminal, of a device that can be remotely controlled in an infrared manner, and setting a picture whose appearance characteristic value of a photographed object is consistent with a stored appearance characteristic value of the photographed object as the picture of the to-be-remotely-controlled device.

With reference to the second possible implementation manner of the fourth aspect, in a third possible implementation manner, after setting, by the terminal, a picture whose appearance characteristic value of a photographed object is consistent with a stored appearance characteristic value of the photographed object as the picture of the to-be-remotely-controlled device, and before establishing, by the terminal for each determined set of spatial angle coordinates, a pairing with the to-be-remotely-controlled device at the spatial angle coordinates, the method further includes determining a type of the to-be-remotely-controlled device in the picture according to an appearance characteristic value of a photographed object in the picture whose appearance characteristic value of a photographed object is consistent with a stored appearance characteristic value of the photographed object, and sending, by the terminal for each determined set of spatial angle coordinates, the infrared signal to the to-be-remotely-controlled device at the spatial angle coordinates in order to establish a pairing with the to-be-remotely-controlled device includes selecting, by the terminal for each determined set of spatial angle coordinates according to a type of a to-be-remotely-controlled device at the spatial angle coordinates, an infrared code from the infrared code library stored in the terminal, and sending, by the terminal, the infrared signal to the to-be-remotely-controlled device according to the selected infrared code in order to establish a pairing with the to-be-remotely-controlled device.

With reference to the fourth aspect, in a fourth possible implementation manner, sending, by the terminal, an infrared signal to the to-be-remotely-controlled device according to the selected infrared code in order to establish a pairing with the to-be-remotely-controlled device includes sensing, by the terminal using a sensor of the terminal, a status change of the to-be-remotely-controlled device that occurs after the to-be-remotely-controlled device receives the infrared signal and after sending the infrared signal, and determining, by the terminal according to the status change of the to-be-remotely-controlled device that is sensed by the sensor, whether the terminal successfully establishes a pairing with the to-be-remotely-controlled device.

With reference to the fourth possible implementation manner of the fourth aspect, in a fifth possible implementation manner, the determining, by the terminal according to the status change of the to-be-remotely-controlled device that is sensed by the sensor, whether the terminal successfully establishes a pairing with the to-be-remotely-controlled device includes determining, by the terminal, the status change of the to-be-remotely-controlled device according to operation sensing information, where the operation sensing information is information obtained by the sensor according to the sensed status change of the to-be-remotely-controlled device that occurs after the to-be-remotely-controlled device receives the infrared signal, and determining, by the terminal, that the terminal successfully establishes a pairing with the to-be-remotely-controlled device when the determined status change of the to-be-remotely-controlled device is consistent with an operation indicated by the infrared signal, or determining, by the terminal, that the terminal fails to establish a pairing with the to-be-remotely-controlled device when the determined status change of the to-be-remotely-controlled device is inconsistent with an operation indicated by the infrared signal.

With reference to the fifth possible implementation manner of the fourth aspect, in a sixth possible implementation manner, the sensor includes a sound sensor and/or a camera.

In the terminal having an infrared remote control function provided in the first aspect and the pairing method for infrared remote control provided in the third aspect, for a particular to-be-remotely-controlled device, after sending an infrared signal to the to-be-remotely-controlled device, the terminal senses a status change of the to-be-remotely-controlled device using a sensor of the terminal, and the terminal determines, according to the sensed status change of the to-be-remotely-controlled device, whether the terminal successfully establishes a pairing with the to-be-remotely-controlled device. A solution in which a terminal automatically establishes a pairing with a to-be-remotely-controlled device is provided, and an automation degree of a pairing process during intelligent remote control is improved.

In the terminal having an infrared remote control function provided in the second aspect and the pairing method for infrared remote control provided in the fourth aspect, the terminal controls a rotation apparatus of the terminal to drive the terminal to rotate in a horizontal direction and a vertical direction, in a rotation process, the terminal determines spatial angle coordinates of each surrounding to-be-remotely-controlled device relative to the terminal, for each determined set of spatial angle coordinates, the terminal controls the rotation apparatus to rotate the terminal according to the determined spatial angle coordinates such that an infrared signal sent by the terminal points to a to-be-remotely-controlled device at the spatial angle coordinates, and then, the terminal sends the infrared signal to the to-be-remotely-controlled device at the spatial angle coordinates in order to establish a pairing with the to-be-remotely-controlled device. In this way, the terminal automatically establishes a pairing with multiple surrounding to-be-remotely-controlled devices.

DESCRIPTION OF EMBODIMENTS

Figure 1A:
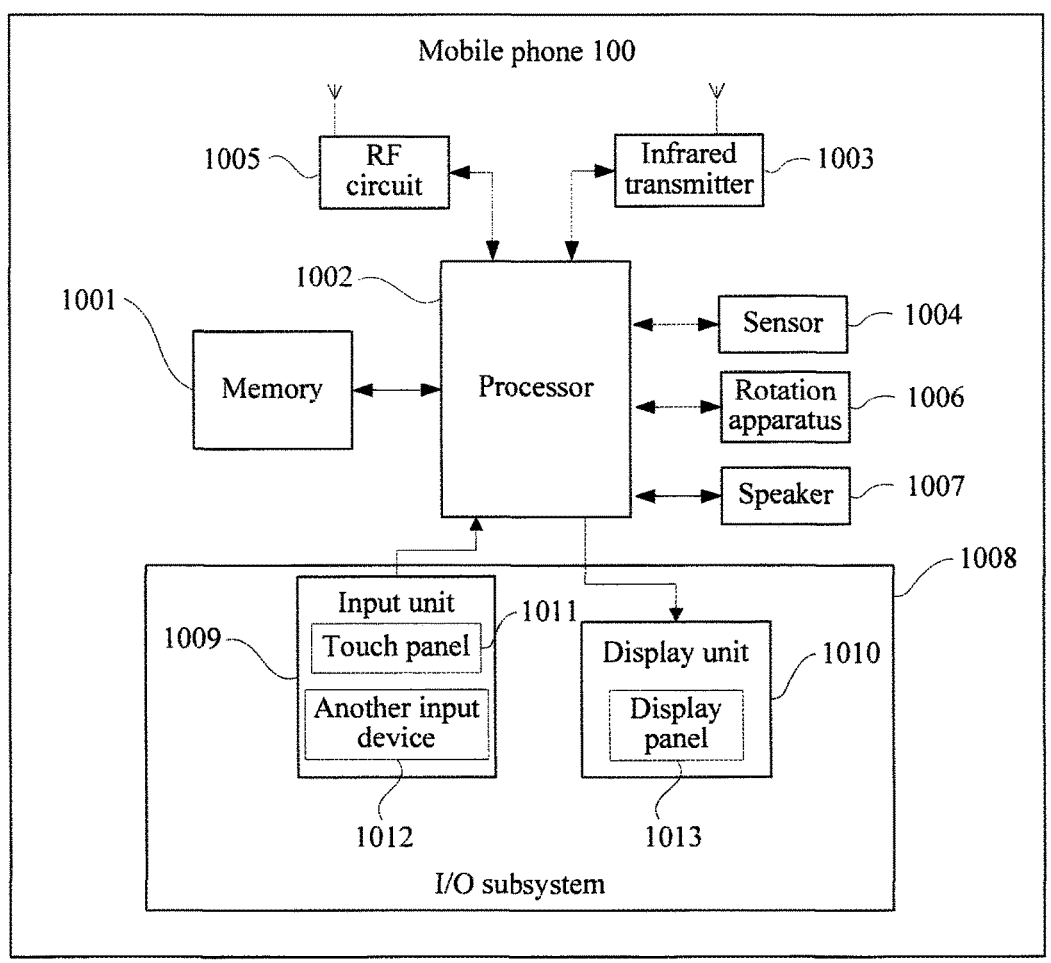
FIG. 1A is a schematic structural diagram of a mobile phone according to an embodiment of the present disclosure.

Embodiments of the present disclosure provide a terminal having an infrared remote control function and a pairing method for infrared remote control in order to provide a solution for automatically establishing a pairing with a to-be-remotely-controlled device, and improve an automation degree of a pairing process during intelligent remote control.

First, the embodiments of the present disclosure provide a first terminal having an infrared remote control function and a first pairing method for infrared remote control. In the first terminal having an infrared remote control function, a memory is configured to store an infrared code library, a processor is configured to select an infrared code from the infrared code library stored in the memory, an infrared transmitter is configured to send an infrared signal to a to-be-remotely-controlled device according to the infrared code selected by the processor, a sensor is configured to sense a status change of the to-be-remotely-controlled device that occurs after the to-be-remotely-controlled device receives the infrared signal after the infrared transmitter sends the infrared signal, and the processor is further configured to determine, according to the status change of the to-be-remotely-controlled device that is sensed by the sensor, whether the terminal successfully establishes a pairing with the to-be-remotely-controlled device.

For a particular to-be-remotely-controlled device, after sending an infrared signal to the to-be-remotely-controlled device, the terminal senses a status change of the to-be-remotely-controlled device using the sensor of the terminal, and the terminal determines, according to the sensed status change of the to-be-remotely-controlled device, whether the terminal successfully establishes a pairing with the to-be-remotely-controlled device. A solution in which a terminal automatically establishes a pairing with a to-be-remotely-controlled device is provided, and an automation degree of a pairing process during intelligent remote control is improved.

Further, in a pairing process, that the terminal determines spatial angle coordinates of the to-be-remotely-controlled device relative to the terminal, and controls a rotation apparatus of the terminal to drive, according to the determined spatial angle coordinates, the terminal to rotate such that the infrared signal sent by the terminal points to the to-be-remotely-controlled device, and then, the terminal sends the infrared signal to the to-be-remotely-controlled device in order to establish a pairing with the to-be-remotely-controlled device. The terminal uses the rotation apparatus to drive the terminal to rotate to a direction of the to-be-remotely-controlled device, and then sends the infrared signal, which further improves the automation degree of the pairing process.

Further, when the terminal determines the spatial angle coordinates of the to-be-remotely-controlled device relative to the terminal, the terminal controls the rotation apparatus to drive the terminal to rotate, and locates the terminal in a rotation process using the sensor of the terminal, which also further improves the automation degree of the pairing process.

Moreover, the embodiments of the present disclosure provide a second terminal having an infrared remote control function and a second pairing method for infrared remote control.

The second terminal having an infrared remote control function includes a processor, an infrared transmitter, and a rotation apparatus. The rotation apparatus is configured to drive the terminal to rotate in a horizontal direction and a vertical direction under the control of the processor. The infrared transmitter is configured to emit an infrared signal to a to-be-remotely-controlled device under the control of the processor, and in a process of controlling the rotation apparatus to drive the terminal to rotate, the processor is configured to determine spatial angle coordinates of each to-be-remotely-controlled device in to-be-remotely-controlled devices surrounding the terminal relative to the terminal, control, for each determined set of spatial angle coordinates, the rotation apparatus to rotate the terminal according to the spatial angle coordinates such that the infrared signal sent by the terminal points to a to-be-remotely-controlled device at the spatial angle coordinates, and then control the infrared transmitter to send the infrared signal to the to-be-remotely-controlled device such that the terminal establishes a pairing with the to-be-remotely-controlled device.

The terminal controls the rotation apparatus of the terminal to drive the terminal to rotate in the horizontal direction and the vertical direction, in a rotation process, the terminal determines the spatial angle coordinates of each surrounding to-be-remotely-controlled device relative to the terminal, the terminal controls, for each determined set of spatial angle coordinates, the rotation apparatus to rotate the terminal according to the determined spatial angle coordinates such that the infrared signal sent by the terminal points to the to-be-remotely-controlled device at the spatial angle coordinates, and then, the terminal sends the infrared signal to the to-be-remotely-controlled device at the spatial angle coordinates in order to establish a pairing with the to-be-remotely-controlled device. In this way, the terminal automatically establishes a pairing with multiple surrounding to-be-remotely-controlled devices.

The embodiments of the present disclosure are described in detail below with reference to the accompanying drawings. First, the first terminal having an infrared remote control function and the second terminal having an infrared remote control function provided in the embodiments of the present disclosure are described, and then, the first pairing method for infrared remote control and the second pairing method for infrared remote control provided in the embodiments of the present disclosure are described.

The first pairing method for infrared remote control and the first terminal having an infrared remote control function share a same inventive idea. In the following, when the first terminal having an infrared remote control function is described, an automatic pairing principle of the terminal is described in detail. A problem resolving principle of the first pairing method for infrared remote control is similar to that of the first terminal having an infrared remote control function. For implementation of the method, reference may be made to the first terminal having an infrared remote control function. Therefore, the first pairing method for infrared remote control is briefly described, and details are not repeated.

The second pairing method for infrared remote control and the second terminal having an infrared remote control function share a same inventive idea. In the following, when the second terminal having an infrared remote control function is described, an automatic pairing principle of the terminal is described in detail. A problem resolving principle of the second pairing method for infrared remote control is similar to that of the second terminal having an infrared remote control function. For implementation of the method, reference may be made to the second terminal having an infrared remote control function. Therefore, the second pairing method for infrared remote control is briefly described, and details are not repeated.

A mobile phone 100 shown in FIG. 1A is used as an example below in order to generally describe an optional structure of a terminal having an infrared remote control function provided in an embodiment of the present disclosure.

It should be understood that the mobile phone 100 shown in FIG. 1A is merely an example of the terminal provided in this embodiment of the present disclosure, and the mobile phone 100 may have more or fewer components than those shown in FIG. 1A, may combine two or more components, or may have a different component configuration. The components shown in FIG. 1A may be implemented in hardware, software, or a combination of hardware and software that includes one or more signal processing and/or application-specific integrated circuits.

As shown in FIG. 1A, the mobile phone 100 includes a memory 1001, a processor 1002, an infrared transmitter 1003, a sensor 1004, a radio frequency (RF) circuit 1005, a speaker 1007, and an input/output (I/O) subsystem 1008, where the I/O subsystem 1008 includes an input unit 1009 and a display unit 1010, and the input unit 1009 includes a touch panel 1011 and input device 1012. Optionally, in an optional implementation manner provided in this embodiment of the present disclosure, the mobile phone 100 may further include a rotation apparatus 1006.

It should be noted that the mobile phone 100 is merely an example of the terminal provided in this embodiment of the present disclosure, and the terminal involved in this embodiment of the present disclosure may have more or fewer components than those shown in FIG. 1A, may combine two or more components, or may have a different component configuration or setting. The components may be implemented in hardware, software, or a combination of hardware and software that includes one or more signal processing and/or application-specific integrated circuits.

The terminal provided in this embodiment of the present disclosure may include a mobile phone, a tablet computer, a personal digital assistant (PDA), a point of sale terminal (POS), an in-vehicle computer, and the like.

The following further describes the components of the mobile phone 100 with reference to FIG. 1A.

The RF circuit 1005 may be configured to receive and send signals during an information receiving and sending process or a call process. Particularly, the RF circuit 1005 receives downlink information from a base station, then delivers the downlink information to the processor 1002 for processing, and sends uplink data to the base station. Generally, the RF circuit 1005 includes, but is not limited to, an antenna, at least one amplifier, a transceiver, a coupler, a low noise amplifier (LNA), and a duplexer. In addition, the RF circuit 1005 may also communicate with a network and another device by means of wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), electronic mail (e-mail), Short Messaging Service (SMS), and the like.

The memory 1001 may be configured to store a software program and module. The processor 1002 runs the software program and module stored in the memory 1001 in order to implement various functional applications and data processing of the mobile phone 100. The memory 1001 may mainly include a program storage area and a data storage area. The program storage area may store an operating system, at least one application program needed by a function (for example, a sound playback function and an image display function), and the like. The data storage area may store data created according to usage of the mobile phone 100 (for example, audio data and a phone book), and the like, and in this embodiment of the present disclosure, may be configured to store an infrared code library, an appearance characteristic value of a to-be-remotely-controlled device, a correspondence between an appearance characteristic value of a to-be-remotely-controlled device and a type and/or a model of the to-be-remotely-controlled device, a picture of an object photographed by a camera, spatial angle coordinates of a to-be-remotely-controlled device relative to the mobile phone 100, and the like. In addition, the memory 1001 may include a high speed random access memory (RAM), and may also include a non-volatile memory such as at least one magnetic disk storage device, a flash memory, or another volatile solid-state storage device.

The input unit 1009 may be configured to receive input digit or character information, and generate keyboard signal input related to a user setting and function control of the mobile phone 100. Further, the input unit 1009 may include a touch panel 1011 and input device 1012. The touch panel 1011, also referred to as a touchscreen, may collect a touch operation of a user on or near the touch panel 1011 (such as an operation of a user on the touch panel 1011 or near the touch panel 1011 using any suitable object or accessory such as a finger or a stylus), and drive a corresponding connection apparatus according to a preset program. Optionally, the touch panel 1011 may include two parts a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 1002. Moreover, the touch controller can receive and execute a command sent from the processor 1002. In addition, the touch panel 1011 may be a resistive, capacitive, infrared, or surface sound wave type touch panel. Besides the touch panel 1011, the input unit 1009 may further include the input device 1012. Further, the input device 1012 may include, but is not limited to, one or more of a physical keyboard, a functional key (such as a volume control key or a switch key), a trackball, a mouse, or a joystick.

The display unit 1010 may be configured to display information input by the user or information provided for the user, and various menus of the mobile phone 100. The display unit 1010 may include a display panel 1013. Optionally, the display panel 1013 may be configured using a liquid crystal display (LCD), an organic light-emitting diode (OLED), or the like. Further, the touch panel 1011 may cover the display panel 1013. After detecting a touch operation on or near the touch panel 1011, the touch panel 1011 transfers the touch operation to the processor 1002 in order to determine the type of the touch event. Then, the processor 1002 provides a corresponding visual output on the display panel 1013 according to the type of the touch event. Although in FIG. 1A, the touch panel 1011 and the display panel 1013 are used as two separate components to implement input and output functions of the mobile phone 100, in some embodiments, the touch panel 1011 and the display panel 1013 may be integrated to implement the input and output functions of the mobile phone 100.

The sensor 1004 may include a camera, a microphone, an optical sensor, a motion sensor, and another sensor. In this embodiment of the present disclosure, the camera is considered as an image sensor, and obtains an image of a device surrounding the mobile phone 100, and the obtained image is used to recognize a status change of a to-be-remotely-controlled device surrounding the mobile phone. In this embodiment of the present disclosure, the microphone is considered as a sound sensor, and obtains sound surrounding the mobile phone 100, and the status change of the to-be-remotely-controlled device is recognized according to the obtained sound. In this embodiment of the present disclosure, the status change of the to-be-remotely-controlled device surrounding the mobile phone 100 may be sensed using the optical sensor. For example, after the mobile phone 100 sends an infrared signal "power on" to a to-be-remotely-controlled television, the optical sensor may sense a lightness change of a screen of the television in order to determine whether the television has responded to the infrared signal sent by the mobile phone 100. In addition, the optical sensor may further adjust lightness of the display panel 1013 according to lightness of ambient light, and a proximity sensor may turn off the display panel 1013 and/or backlight when the mobile phone 100 moves near an ear. As one type of motion sensor, an acceleration sensor may detect magnitude of accelerations in various directions (generally on three axes), may detect magnitude and a direction of the gravity when static, and may be applied to an application that recognizes the attitude of the mobile phone 100 (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone 100, are not further described herein.

The infrared transmitter 1003 includes an infrared emitter, and emits an infrared ray within a particular range using the infrared emitter in order to control a to-be-remotely-controlled device. The infrared emitter is a light emitting diode (LED), and in the field of remote control technologies, an infrared LED is usually used as an optical transmit device.

The processor 1002 is a control center of the mobile phone 100, and is connected to various parts of the mobile phone 100 using various interfaces and lines. By running or executing the software program and/or module stored in the memory 1001, and invoking data stored in the memory 1001, the processor 1002 performs various functions and data processing of the mobile phone 100, thereby performing overall monitoring on the mobile phone 100. Optionally, the processor 1002 may include one or more processing units. Preferably, an application processor and a modem processor may be integrated into the processor 1002. The application processor mainly processes an operating system, a user interface, an application program, and the like. The modem processor mainly processes wireless communication. It may be understood that the foregoing modem processor may also not be integrated into the processor 1002.

Under the control of the processor 1002, the rotation apparatus 1006 drives the mobile phone 100 to rotate in a horizontal direction and a vertical direction.

Although not shown, the mobile phone 100 may further include a BLUETOOTH module, a global positioning system (GPS), and the like, and details are not described herein.

The following describes in detail a terminal having an infrared remote control function provided in an embodiment of the present disclosure. For simple illustration, refer to a schematic structural diagram shown in FIG. 1B. The mobile phone 100 shown in FIG. 1A may be considered as an optional implementation manner of a terminal 10 shown in FIG. 1B.

Figure 1B:
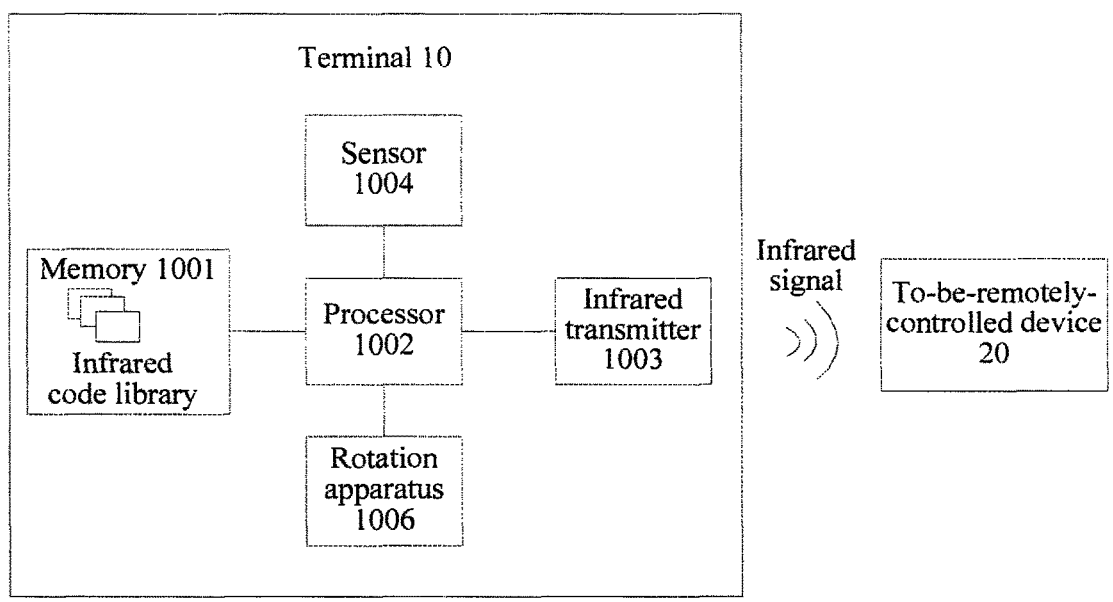
FIG. 1B is a schematic structural diagram of a terminal having an infrared remote control function according to an embodiment of the present disclosure.

Referring to FIG. 1B, the terminal 10 includes a memory 1001 configured to store an infrared code library, a processor 1002 configured to select an infrared code from the infrared code library stored in the memory 1001, an infrared transmitter 1003 configured to send an infrared signal to a to-be-remotely-controlled device 20 according to the infrared code selected by the processor 1002, and after the infrared transmitter 1003 sends the infrared signal, a sensor 1004 configured to sense a status change of the to-be-remotely-controlled device 20 that occurs after the to-be-remotely-controlled device 20 receives the infrared signal, where the processor 1002 is further configured to determine, according to the status change of the to-be-remotely-controlled device 20 that is sensed by the sensor 1004, whether the terminal 10 successfully establishes a pairing with the to-be-remotely-controlled device 20.

The processor 1002, the memory 1001, the infrared transmitter 1003, and the sensor 1004 may be connected as shown in FIG. 1B, where the memory 1001, the infrared transmitter 1003, and the sensor 1004 are all connected to the processor 1002, or may be connected using a bus, where the processor 1002, the memory 1001, the infrared transmitter 1003, and the sensor 1004 are all connected to the bus, and signals and data between them are transmitted using the bus.

The infrared code library stored in the memory 1001 may include multiple infrared codes, where the multiple infrared codes are respectively used to remotely control multiple devices that can be remotely controlled in an infrared manner. Optionally, the processor 1002 may select, from the infrared code library according to a type and/or a model of the to-be-remotely-controlled device 20, the infrared code used to remotely control the to-be-remotely-controlled device 20. Alternatively, the processor 1002 may traverse the infrared codes in the infrared code library, and after the infrared transmitter 1003 sends an infrared signal according to an infrared code, if the processor 1002 determines, according to a status change of the to-be-remotely-controlled device 20 that is sensed by the sensor 1004, that the terminal 10 successfully establishes a pairing with the to-be-remotely-controlled device 20, the processor 1002 determines that the infrared code is an infrared code for the to-be-remotely-controlled device 20. When a user subsequently uses the terminal 10 to remotely control the to-be-remotely-controlled device 20, the processor 1002 may select the determined infrared code from the infrared code library, and control the infrared transmitter 1003 to send, according to the determined infrared code, an infrared signal to the to-be-remotely-controlled device 20 in order to remotely control the to-be-remotely-controlled device 20.

Alternatively, to reduce a probability of incorrect determining, after determining, according to the status change of the to-be-remotely-controlled device 20 that is sensed by the sensor 1004, that the terminal 10 successfully establishes a pairing with the to-be-remotely-controlled device 20, the processor 1002 may control the infrared transmitter 1003 to send another instruction to the to-be-remotely-controlled device 20 according to the determined infrared code, and only after determining again, according to a status change of the to-be-remotely-controlled device 20 that is sensed by the sensor 1004, that the terminal 10 successfully establishes a pairing with the to-be-remotely-controlled device 20, the processor 1002 determines that the infrared code is an infrared code for the to-be-remotely-controlled device 20.

When sending the infrared signal, the infrared transmitter 1003 may encode the infrared signal according to the infrared code selected from the infrared code library stored in the memory 1001, and send the encoded infrared signal to the to-be-remotely-controlled device 20.

For example, the infrared transmitter 1003 usually further includes an encoding integrated circuit and a drive transistor in addition to the infrared emitter. The encoding integrated circuit performs encoding according to the infrared code selected by the processor 1002, and generates a serial pulse, where the pulse is driven by the drive transistor and is emitted by the infrared emitter.

After the infrared transmitter 1003 sends the infrared signal to the to-be-remotely-controlled device 20 according to the infrared code selected by the processor 1002, the processor 1002 determines, according to the status change of the to-be-remotely-controlled device 20 that is sensed by the sensor 1004, whether the terminal 10 successfully establishes a pairing with the to-be-remotely-controlled device 20.

Further, the processor 1002 receives operation sensing information sent by the sensor 1004, where the operation sensing information is information obtained by the sensor 1004 according to the sensed status change of the to-be-remotely-controlled device 20 that occurs after the to-be-remotely-controlled device 20 receives the infrared signal.

The processor 1002 determines the status change of the to-be-remotely-controlled device 20 according to the operation sensing information, and when the determined status change of the to-be-remotely-controlled device 20 is consistent with an operation indicated by the infrared signal, the processor 1002 determines that the terminal 10 successfully establishes a pairing with the to-be-remotely-controlled device 20, or when the determined status change of the to-be-remotely-controlled device 20 is inconsistent with an operation indicated by the infrared signal, the processor 1002 determines that the terminal 10 fails to establish a pairing with the to-be-remotely-controlled device 20.

The sensor 1004 may include a camera and/or a sound sensor, for example, a microphone.

For examples in which the sensor 1004 senses an operation of the to-be-remotely-controlled device 20, and the processor 1002 determines, according to the status change of the to-be-remotely-controlled device 20 that is sensed by the sensor 1004, whether the terminal 10 successfully establishes a pairing with the to-be-remotely-controlled device 20, reference may be made to the following Embodiment 1, Embodiment 2, and Embodiment 3.

Optionally, as shown in FIG. 1B, the terminal 10 further includes a rotation apparatus 1006, and under the control of the processor 1002, the rotation apparatus 1006 drives the terminal 10 to rotate in a horizontal direction and a vertical direction. The rotation apparatus 1006 may be detached from the terminal 10, or the rotation apparatus 1006 has been fixedly installed on the terminal 10 before delivery.

Figure 2:
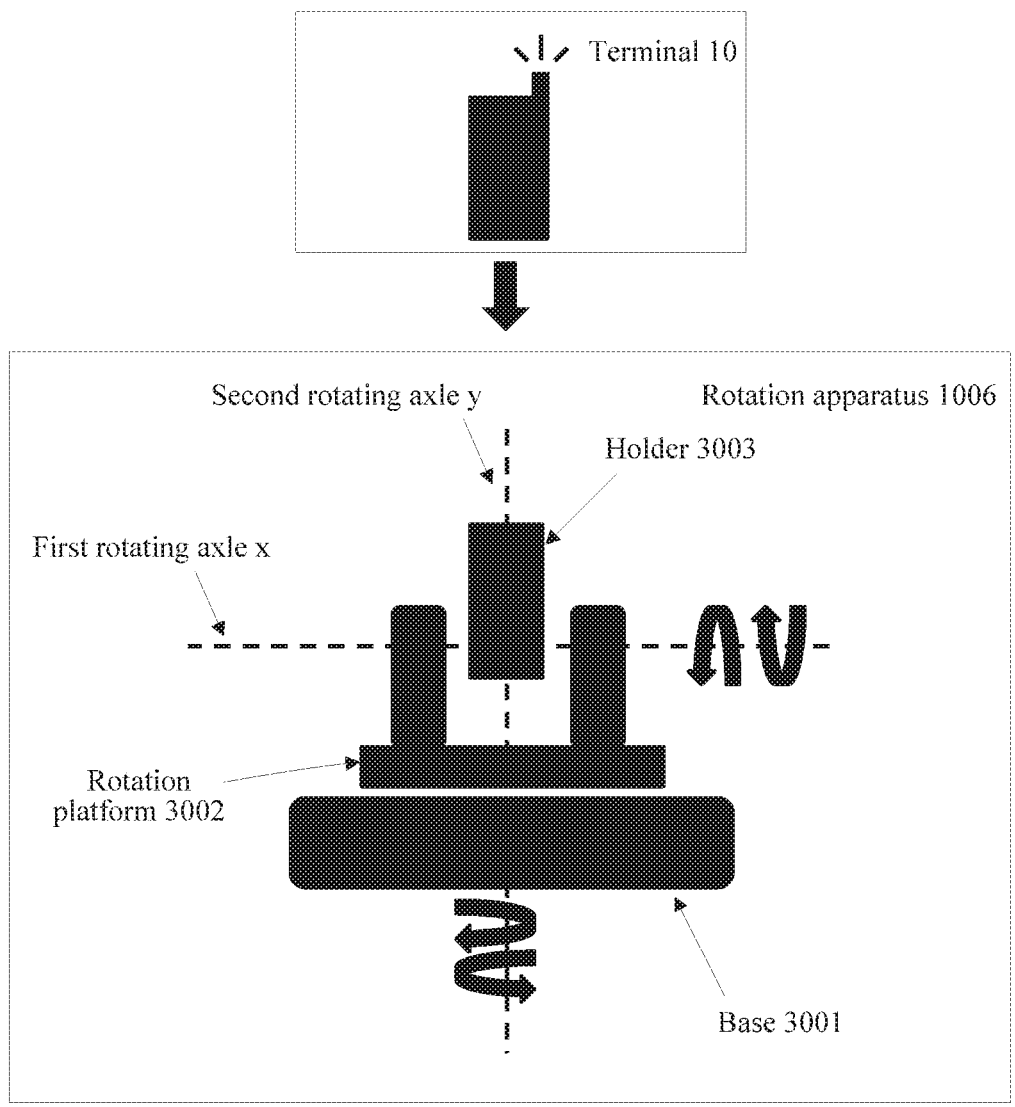
FIG. 2 is a schematic diagram of a connection relationship of a connection between a terminal having an infrared remote control function and a rotation apparatus according to an embodiment of the present disclosure.

In FIG. 2, the terminal 10 may be inserted into and engaged with a holder 3003 along a direction indicated by an arrow, and is fixed on the rotation apparatus 1006 using the holder 3003. The rotation apparatus 1006 includes a base 3001, a rotation platform 3002, the holder 3003, a first rotating axle x, and a second rotating axle y, where the first rotating axle x and the second rotating axle y are perpendicular to each other.

The first rotating axle x is installed on protruded portions on two sides of the concave rotation platform 3002, a concave portion of the rotation platform 3002 is configured to accommodate a lower portion of the holder 3003, and the first rotating axle x is connected to the holder 3003, fixes the holder 3003 in a horizontal direction, can drive the holder 3003 to rotate around the first rotating axle x, and is configured to change a pitch angle of the terminal 10 when the terminal 10 is placed on the holder 3003.

The rotation platform 3002 is installed on the base 3001 using the second rotating axle y, and the second rotating axle y can drive the rotation platform 3002 to rotate around the second rotating axle y in a horizontal direction.

Using a control interface on the holder 3003, the terminal 10 may send, to the first rotating axle x, an instruction for controlling the first rotating axle x to rotate, and send, to the second rotating axle y, an instruction for controlling the second rotating axle y to rotate. The terminal 10 may control rotation speeds and angles of the first rotating axle x and the second rotating axle y using instructions.

It should be noted that, the connection relationship and the manner in which the rotation apparatus 1006 drives the terminal 10 to rotate that are shown in FIG. 2 are merely exemplary, and actually, any solution that can drive the terminal 10 to rotate in a horizontal direction and a vertical direction is applicable to the present disclosure.

Optionally, the processor 1002 is further configured to before the infrared transmitter 1003 emits the infrared signal to the to-be-remotely-controlled device 20, determine spatial angle coordinates ($\varphi$, $\alpha$) of the to-be-remotely-controlled device 20 relative to the terminal 10, where $\varphi$ is a pitch angle, that is, an included angle between a line that connects the to-be-remotely-controlled device 20 and the terminal 10 and a horizontal plane, and $\alpha$ is a horizontal angle, that is, an included angle between the line that connects the to-be-remotely-controlled device 20 and the terminal 10 and a preset vertical plane whose horizontal angle is 0°. Values of $\varphi$ and $\alpha$ may be determined according to specific implementation, for example, a value range of $\varphi$ is [−30°, 80°], and a value range of $\alpha$ is [−180°, 180°).

The spatial angle coordinates of the to-be-remotely-controlled device 20 relative to the terminal 10 may be determined using a gyroscope in the terminal 10, where the gyroscope is a sensor, and may be configured to sense a location of the terminal.

The processor 1002 controls the rotation apparatus 1006 to rotate the terminal 10 such that the infrared signal sent by the terminal 10 points to the to-be-remotely-controlled device 20, that is, after the included angle between the line that connects the terminal 10 and the to-be-remotely-controlled device 20 and the horizontal plane is $\varphi$, and the included angle between the line that connects the terminal 10 and the to-be-remotely-controlled device 20 and the preset vertical plane whose horizontal angle is 0° is $\alpha$, the processor 1002 controls the infrared transmitter 1003 to send the infrared signal to the to-be-remotely-controlled device 20 according to the infrared code selected by the processor 1002.

Further, the sensor 1004 includes a camera, and the processor 1002 may further determine the spatial angle coordinates of the to-be-remotely-controlled device 20 relative to the terminal 10 in the following manner.

First, the camera is controlled to separately take a picture every preset time interval, every preset horizontal angle and vertical angle, or at multiple preset spatial angles in a process in which the rotation apparatus 1006 drives the terminal 10 to rotate.

Then, corresponding to each picture taken by the camera, a pitch angle and a horizontal angle of the terminal 10 at which the picture is taken are recorded. Optionally, the pitch angle and the horizontal angle of the picture and a correspondence between the pitch angle and the horizontal angle and the picture may be recorded in a cache of the processor 1002, or recorded in the memory 1001.

Next, a picture of the to-be-remotely-controlled device 20 is determined from pictures taken by the camera, and a picture in which the to-be-remotely-controlled device 20 is in the center is determined from the determined picture of the to-be-remotely-controlled device 20.

Optionally, the picture in which the to-be-remotely-controlled device 20 is in the center may be determined from pictures of the to-be-remotely-controlled device 20 using the following image center preferred algorithm.

The image center preferred algorithm aims to find, from a group of pictures that include a same to-be-remotely-controlled device 20, a picture in which the to-be-remotely-controlled device 20 is in the center. Further, an edge of the to-be-remotely-controlled device 20 may be found according to a difference between contrasts, a motion trend of the to-be-remotely-controlled device 20 in pictures is determined by comparing edges of the to-be-remotely-controlled device 20 in multiple continuous pictures, and when a motion trend of the to-be-remotely-controlled device 20 reverses in a picture, it is determined that the picture is a picture in which the to-be-remotely-controlled device 20 is in the center.

Finally, a recorded pitch angle and horizontal angle of the terminal that correspond to the picture in which the to-be-remotely-controlled device 20 is in the center are set as the spatial angle coordinates of the to-be-remotely-controlled device 20 relative to the terminal 10.

The memory 1001 may be further configured to store an appearance characteristic value of the to-be-remotely-controlled device 20.

The appearance characteristic value of the to-be-remotely-controlled device 20 that is stored in the memory 1001 may be obtained by the terminal 10 by means of pre-learning. The camera that serves as the sensor 1004 may photograph in advance the to-be-remotely-controlled device 20, or another device that is of a type and a model the same as those of the to-be-remotely-controlled device 20 and that can be remotely controlled in an infrared manner, and the processor 1002 extracts an appearance characteristic value of an object in a picture taken by the camera, sets the extracted characteristic value as an appearance characteristic value of the to-be-remotely-controlled device 20, and stores the appearance characteristic value in the memory 1001.

The processor 1002 may extract an appearance characteristic value of a photographed object in each picture taken by the camera, compare the extracted appearance characteristic value with the appearance characteristic value of the to-be-remotely-controlled device 20 that is stored in the terminal, and sets a picture whose appearance characteristic value of a photographed object is consistent with the stored appearance characteristic value of the to-be-remotely-controlled device 20 as the picture of the to-be-remotely-controlled device 20.

In addition, the processor 1002 may further determine a type and/or a model of the to-be-remotely-controlled device 20 according to the extracted characteristic value of the to-be-remotely-controlled device 20. For example, the memory 1001 pre-stores a correspondence between a characteristic value and a type or/a model, and the processor 1002 may determine the type and/or the model of the to-be-remotely-controlled device 20 by querying the correspondence between a characteristic value and a type or/a model that is pre-stored in the memory 1001.

Optionally, a picture whose appearance characteristic value of a photographed object is the same as the stored appearance characteristic value of the to-be-remotely-controlled device 20 may be used as the picture of the to-be-remotely-controlled device 20.

Alternatively, a picture may be used as the picture of the to-be-remotely-controlled device 20, where an absolute difference between an appearance characteristic value of a photographed object in the picture and the stored appearance characteristic value of the to-be-remotely-controlled device 20 is less than a preset characteristic value difference threshold.

The foregoing describes a terminal 10 having an infrared remote control function provided in an embodiment of the present disclosure, where the terminal 10 can automatically establish a pairing with a particular to-be-remotely-controlled device 20. The following describes another terminal having an infrared remote control function provided in an embodiment of the present disclosure, where the other terminal can automatically establish a pairing with each surrounding to-be-remotely-controlled device.

The other terminal having an infrared remote control function provided in this embodiment of the present disclosure may also be shown in FIG. 1B. The mobile phone 100 shown in FIG. 1A may be considered as an optional implementation manner of the second terminal having an infrared remote control function provided in this embodiment of the present disclosure.

Referring to FIG. 1B, the terminal 10 includes a processor 1002, an infrared transmitter 1003, and a rotation apparatus 1006.

The rotation apparatus 1006 is configured to drive the terminal 10 to rotate in a horizontal direction and a vertical direction under the control of the processor 1002.

The infrared transmitter 1003 is configured to emit an infrared signal to a to-be-remotely-controlled device 20 under the control of the processor 1002.

In a process of controlling the rotation apparatus 1006 to drive the terminal 10 to rotate, the processor 1002 is configured to determine spatial angle coordinates of each to-be-remotely-controlled device 20 in to-be-remotely-controlled devices 20 surrounding the terminal 10 relative to the terminal 10, and control, for each determined set of spatial angle coordinates, the rotation apparatus 1006 to rotate the terminal 10 according to the spatial angle coordinates such that the infrared signal sent by the terminal 10 points to a to-be-remotely-controlled device 20 at the spatial angle coordinates, and then control the infrared transmitter 1003 to send the infrared signal to the to-be-remotely-controlled device 20 at the spatial angle coordinates such that the terminal 10 establishes a pairing with the to-be-remotely-controlled device 20.

Each to-be-remotely-controlled device 20 surrounding the terminal 10 refers to a to-be-remotely-controlled device 20 that can be scanned by the infrared signal sent by the infrared transmitter 1003 of the terminal 10, for example, all devices that can be remotely controlled in an infrared manner in a room.

Compared with the terminal having an infrared remote control function provided in the foregoing embodiment of the present disclosure, the other terminal having an infrared remote control function can establish a pairing with each surrounding to-be-remotely-controlled device 20. Therefore, during specific application, for the other terminal having an infrared remote control function, there may be multiple to-be-remotely-controlled devices 20 surrounding the other terminal.

In a process in which the rotation apparatus 1006 drives the terminal 10 to rotate, the processor 1002 locates each to-be-remotely-controlled device 20 surrounding the terminal 10 such that the terminal 10 establishes a pairing with each surrounding to-be-remotely-controlled device 20.

For a connection relationship between the terminal 10 and the rotation apparatus 1006, reference may be made to the connection relationship between the terminal 10 and the rotation apparatus 1006 shown in FIG. 2. For a structure and composition of the rotation apparatus 1006, reference may also be made to the rotation apparatus 1006 in FIG. 2. Details are not repeated.

The processor 1002 is further configured to control a camera that serves as a sensor 1004 in order to separately take a picture every preset time interval, every preset horizontal angle and vertical angle, or at multiple preset spatial angles in a process in which the rotation apparatus 1006 drives the terminal 10 to rotate, corresponding to each picture taken by the camera, record a pitch angle and a horizontal angle of the terminal 10 at which the picture is taken, where optionally, the pitch angle and the horizontal angle of the terminal 10 may be stored in a cache of the processor 1002 or in the memory 1001 of the terminal 10, and determine a picture of each to-be-remotely-controlled device 20 from pictures taken by the camera, and for each to-be-remotely-controlled device 20, determine, from the picture of the to-be-remotely-controlled device 20, a picture in which the to-be-remotely-controlled device 20 is in the center.

For a method of selecting, by the processor 1002 from the picture of the to-be-remotely-controlled device 20, a picture in which the to-be-remotely-controlled device 20 is in the center, reference may be made to the method of selecting, by the processor 1002 from the pictures of the to-be-remotely-controlled device 20, a picture in which the to-be-remotely-controlled device 20 is in the center in the first terminal 10 having an infrared remote control function provided in the foregoing embodiment of the present disclosure. Details are not repeated herein.

Next, for each to-be-remotely-controlled device 20, the processor 1002 uses a recorded pitch angle and horizontal angle of the terminal that correspond to the picture in which the to-be-remotely-controlled device 20 is in the center as the spatial angle coordinates of the to-be-remotely-controlled device 20 relative to the terminal 10.

Optionally, the memory 1001 may further store appearance characteristic values of devices that can be remotely controlled in an infrared manner, and for each picture taken by the camera, the processor 1002 may extract an appearance characteristic value of a photographed object in the picture, compare the extracted appearance characteristic value of the photographed object in the picture with the appearance characteristic values, stored in the memory 1001, of the devices that can be remotely controlled in an infrared manner, and set a picture whose appearance characteristic value of a photographed object is consistent with a stored appearance characteristic value of the photographed object as the picture of the to-be-remotely-controlled device 20.

The appearance characteristic values, stored in the memory 1001, of the devices that can be remotely controlled in an infrared manner may be obtained using a learning method the same as that in the first terminal having an infrared remote control function provided in the foregoing embodiment of the present disclosure, and details are not repeated.

Optionally, after setting the picture whose appearance characteristic value of a photographed object is consistent with a stored appearance characteristic value of the photographed object as the picture of the to-be-remotely-controlled device 20, before controlling, for each determined set of spatial angle coordinates, the infrared transmitter 1003 to send an infrared signal to the to-be-remotely-controlled device 20 at the spatial angle coordinates in order to establish a pairing with the to-be-remotely-controlled device 20, the processor 1002 determines a type of the to-be-remotely-controlled device 20 in the picture according to an appearance characteristic value of a photographed object in the picture whose appearance characteristic value of a photographed object is consistent with a stored appearance characteristic value of the photographed object. Optionally, the memory 1001 further stores the infrared code library, and the processor 1002 may select, for each determined set of spatial angle coordinates, according to a type of the to-be-remotely-controlled device 20 at the spatial angle coordinates (for a method for determining the to-be-remotely-controlled device 20, reference may also be made to the terminal having an infrared remote control function provided in the foregoing embodiment of the present disclosure, and details are not described herein again), an infrared code from the infrared code library stored in the memory 1001, and control the infrared transmitter 1003 to send the infrared signal to the to-be-remotely-controlled device 20 according to the selected infrared code such that the terminal 10 establishes a pairing with the to-be-remotely-controlled device 20. Optionally, in addition to the camera that serves as the sensor 1004, the terminal 10 further includes or is connected to another sensor 1004 (for example, a sound sensor), where the sensor 1004 is configured to sense a status change of an object surrounding the terminal 10. After controlling, for each determined set of spatial angle coordinates, the infrared transmitter 1003 to send the infrared signal to the to-be-remotely-controlled device 20 at the spatial angle coordinates, the processor 1002 controls the sensor 1004 to sense a status change of the to-be-remotely-controlled device 20 that occurs after the to-be-remotely-controlled device 20 receives the infrared signal, and determines, according to the status change of the to-be-remotely-controlled device 20 that is sensed by the sensor, whether the terminal 10 successfully establishes a pairing with the to-be-remotely-controlled device 20.

Alternatively, the processor 1002 may traverse infrared codes in the infrared code library, and after the infrared transmitter 1003 sends an infrared signal according to an infrared code, if the processor 1002 determines, according to a status change of the to-be-remotely-controlled device 20 that is sensed by the sensor 1004, that the terminal 10 successfully establishes a pairing with the to-be-remotely-controlled device 20, the processor 1002 determines that the infrared code is an infrared code for the to-be-remotely-controlled device 20. When a user subsequently sets the terminal 10 to remotely control the to-be-remotely-controlled device 20, the processor 1002 may select the determined infrared code from the infrared code library, and control the infrared transmitter 1003 to send, according to the determined infrared code, an infrared signal to the to-be-remotely-controlled device 20 in order to remotely control the to-be-remotely-controlled device 20.

Alternatively, to reduce a probability of incorrect determining, after determining, according to an operation of the to-be-remotely-controlled device 20 that is sensed by the sensor 1004, that the terminal 10 successfully establishes a pairing with the to-be-remotely-controlled device 20, the processor 1002 may control the infrared transmitter 1003 to send another instruction to the to-be-remotely-controlled device 20 according to the determined infrared code, and only after determining again, according to a status change of the to-be-remotely-controlled device 20 that is sensed by the sensor 1004, that the terminal 10 successfully establishes a pairing with the to-be-remotely-controlled device 20, the processor 1002 determines that the infrared code is an infrared code for the to-be-remotely-controlled device 20.

Optionally, the processor 1002 may receive operation sensing information sent by the sensor 1004, where the operation sensing information is information obtained by the sensor 1004 according to the sensed status change of the to-be-remotely-controlled device 20 that occurs after the to-be-remotely-controlled device 20 receives the infrared signal, and the processor 1002 may determine the status change of the to-be-remotely-controlled device 20 according to the operation sensing information, and when the determined status change of the to-be-remotely-controlled device 20 is consistent with an operation indicated by the infrared signal, the processor 1002 determines that the terminal 10 successfully establishes a pairing with the to-be-remotely-controlled device 20, or when the determined status change of the to-be-remotely-controlled device 20 is inconsistent with an operation indicated by the infrared signal, the processor 1002 determines that the terminal 10 fails to establish a pairing with the to-be-remotely-controlled device 20.

For examples in which the sensor 1004 senses an operation of the to-be-remotely-controlled device 20, and the processor 1002 determines, according to the status change of the to-be-remotely-controlled device 20 that is sensed by the sensor 1004, whether the terminal 10 successfully establishes a pairing with the to-be-remotely-controlled device 20, reference may be made to the following Embodiment 1, Embodiment 2, and Embodiment 3.

In the other terminal having an infrared remote control function provided in this embodiment of the present disclosure, the infrared transmitter 1003, the rotation apparatus 1006, and the processor 1002 may be connected in a manner of direct connection shown in FIG. 1B, or may be connected using a bus, where the processor 1002, the rotation apparatus 1006, and the infrared transmitter 1003 are all connected to the bus, and a signal and data between them are transmitted using the bus.

Similarly, the memory 1001, the sensor 1004, and the processor 1002 may be connected in a manner of direct connection, or may be connected using a bus, where the processor 1002, the memory 1001, and the sensor 1004 are all connected to the bus, and a signal and data between them are transmitted using the bus.

The foregoing describes a terminal having an infrared remote control function and another terminal having an infrared remote control function provided in embodiments of the present disclosure. The following describes a first pairing method for infrared remote control and a second pairing method for infrared remote control provided in embodiments of the present disclosure. The first pairing method for infrared remote control and the terminal having an infrared remote control function provided in the embodiments of the present disclosure share a same inventive idea, and for implementation of the method, reference may be made to implementation of the terminal having an infrared remote control function. The second pairing method for infrared remote control and the other terminal having an infrared remote control function provided in the embodiments of the present disclosure share a same inventive idea, and for implementation of the method, reference may be made to the other terminal having an infrared remote control function. Details are not repeated.

Figure 3:
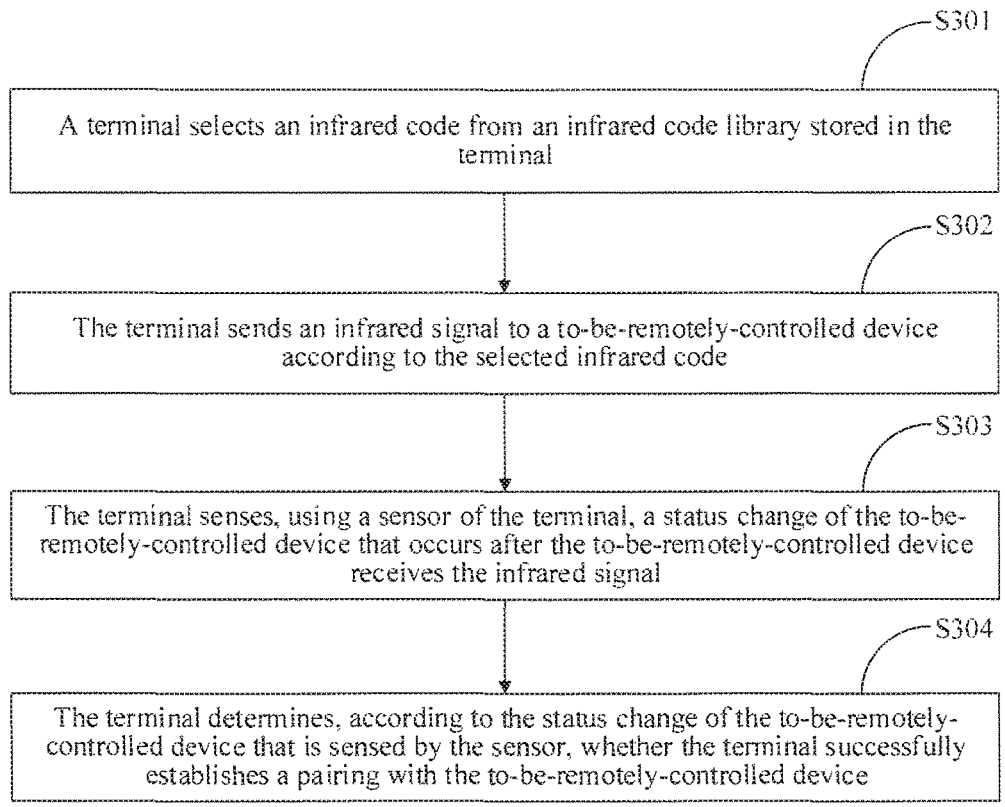
FIG. 3 is a flowchart of a first pairing method for infrared remote control according to an embodiment of the present disclosure.

FIG. 3 is a flowchart of a first pairing method for infrared remote control according to an embodiment of the present disclosure. As shown in FIG. 3, the method includes the following steps.

Step S301: A terminal selects an infrared code from an infrared code library stored in the terminal.

Step S302: The terminal sends an infrared signal to a to-be-remotely-controlled device according to the selected infrared code.

Step S303: The terminal senses, using a sensor of the terminal, a status change of the to-be-remotely-controlled device that occurs after the to-be-remotely-controlled device receives the infrared signal.

Step S304: The terminal determines, according to the status change of the to-be-remotely-controlled device that is sensed by the sensor, whether the terminal successfully establishes a pairing with the to-be-remotely-controlled device.

Optionally, the terminal includes a rotation apparatus configured to drive the terminal to rotate in a horizontal direction and a vertical direction, and before selecting, by the terminal, an infrared code for a to-be-remotely-controlled device from an infrared code library stored in the terminal, the method further includes determining, by the terminal, spatial angle coordinates of the to-be-remotely-controlled device relative to the terminal, and sending, by the terminal, an infrared signal to a to-be-remotely-controlled device according to the selected infrared code includes controlling, by the terminal, the rotation apparatus to rotate the terminal according to the determined spatial angle coordinates such that the infrared signal sent by the terminal points to the to-be-remotely-controlled device.

Optionally, determining, by the terminal, spatial angle coordinates of the to-be-remotely-controlled device relative to the terminal includes controlling, by the terminal, the rotation apparatus to drive the terminal to rotate in a horizontal direction and a vertical direction, separately taking a picture every preset time interval, every preset horizontal angle and vertical angle, or at multiple preset spatial angles in a rotation process, and for each taken picture, recording a pitch angle and a horizontal angle of the terminal at which the picture is taken, determining, by the terminal, a picture of the to-be-remotely-controlled device from taken pictures, and determining, from the determined picture of the to-be-remotely-controlled device, a picture in which the to-be-remotely-controlled device is in the center, and setting, by the terminal, a recorded pitch angle and horizontal angle of the terminal that correspond to the picture in which the to-be-remotely-controlled device is in the center as the spatial angle coordinates of the to-be-remotely-controlled device relative to the terminal.

Optionally, determining, by the terminal, a picture of the to-be-remotely-controlled device from taken pictures includes extracting, by the terminal, an appearance characteristic value of a photographed object in each taken picture, comparing the extracted appearance characteristic value with an appearance characteristic value of the to-be-remotely-controlled device that is stored in the terminal, and setting a picture whose appearance characteristic value of a photographed object is consistent with the stored appearance characteristic value of the to-be-remotely-controlled device as the picture of the to-be-remotely-controlled device.

Optionally, determining, by the terminal according to the sensed status change of the to-be-remotely-controlled device, whether the terminal successfully establishes a pairing with the to-be-remotely-controlled device includes determining, by the terminal, the status change of the to-be-remotely-controlled device according to the operation sensing information, where the operation sensing information is information obtained by the sensor according to the sensed status change of the to-be-remotely-controlled device that occurs after the to-be-remotely-controlled device receives the infrared signal, and determining, by the terminal, that the terminal successfully establishes a pairing with the to-be-remotely-controlled device when the determined status change of the to-be-remotely-controlled device is consistent with an operation indicated by the infrared signal, or determining, by the terminal, that the terminal fails to establish a pairing with the to-be-remotely-controlled device when the determined status change of the to-be-remotely-controlled device is inconsistent with an operation indicated by the infrared signal.

Optionally, the sensor includes a sound sensor and/or a camera.

Figure 4:
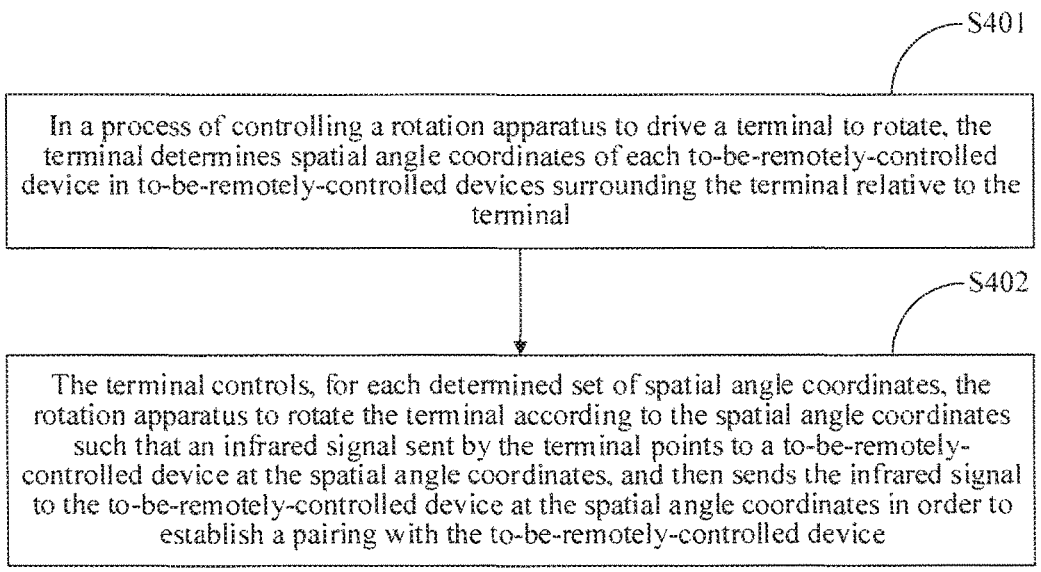
FIG. 4 is a flowchart of a second pairing method for infrared remote control according to an embodiment of the present disclosure.

FIG. 4 is a flowchart of a second pairing method for infrared remote control according to an embodiment of the present disclosure. In this method, a terminal having an infrared remote control function includes a rotation apparatus configured to drive the terminal to rotate in a horizontal direction and a vertical direction. As shown in FIG. 4, the method includes the following steps.

Step S401: In a process of controlling a rotation apparatus to drive the terminal to rotate, the terminal determines spatial angle coordinates of each to-be-remotely-controlled device in to-be-remotely-controlled devices surrounding the terminal relative to the terminal.

Step S402: The terminal controls, for each determined set of spatial angle coordinates, the rotation apparatus to rotate the terminal according to the spatial angle coordinates such that an infrared signal sent by the terminal points to a to-be-remotely-controlled device at the spatial angle coordinates, and then sends the infrared signal to the to-be-remotely-controlled device at the spatial angle coordinates in order to establish a pairing with the to-be-remotely-controlled device.

Optionally, determining, by the terminal, spatial angle coordinates of each to-be-remotely-controlled device in to-be-remotely-controlled devices surrounding the terminal relative to the terminal includes controlling, by the terminal, the rotation apparatus to drive the terminal to rotate in a horizontal direction and a vertical direction, separately taking a picture every preset time interval, every preset horizontal angle and vertical angle, or at multiple preset spatial angles in a rotation process, and for each taken picture, recording a pitch angle and a horizontal angle of the terminal at which the picture is taken, determining, by the terminal, a picture of each to-be-remotely-controlled device from taken pictures, and for each to-be-remotely-controlled device, determining, from the picture of the to-be-remotely-controlled device, a picture in which the to-be-remotely-controlled device is in the center, and for each to-be-remotely-controlled device, setting, by the terminal, a recorded pitch angle and horizontal angle that correspond to the picture in which the to-be-remotely-controlled device is in the center as the spatial angle coordinates of the to-be-remotely-controlled device relative to the terminal.

Optionally, selecting, by the terminal, a picture of each to-be-remotely-controlled device from taken pictures includes extracting, by the terminal, for each taken picture, an appearance characteristic value of a photographed object in the picture, and comparing, by the terminal, the extracted appearance characteristic value of the photographed object in the picture with an appearance characteristic value, stored in the terminal, of a device that can be remotely controlled in an infrared manner, and setting a picture whose appearance characteristic value of a photographed object is consistent with a stored appearance characteristic value of the photographed object as the picture of the to-be-remotely-controlled device.

Optionally, after setting, by the terminal, a picture whose appearance characteristic value of a photographed object is consistent with a stored appearance characteristic value of the photographed object as the picture of the to-be-remotely-controlled device, and before, establishing, by the terminal for each determined set of spatial angle coordinates, a pairing with the to-be-remotely-controlled device at the spatial angle coordinates, the method further includes determining a type of the to-be-remotely-controlled device in the picture according to an appearance characteristic value of a photographed object in the picture whose appearance characteristic value of a photographed object is consistent with a stored appearance characteristic value of the photographed object, and sending, by the terminal for each determined set of spatial angle coordinates, the infrared signal to the to-be-remotely-controlled device at the spatial angle coordinates in order to establish a pairing with the to-be-remotely-controlled device includes selecting, by the terminal for each determined set of spatial angle coordinates according to a type of a to-be-remotely-controlled device at the spatial angle coordinates, an infrared code from the infrared code library stored in the terminal, and sending, by the terminal, the infrared signal to the to-be-remotely-controlled device according to the selected infrared code in order to establish a pairing with the to-be-remotely-controlled device.

Optionally, sending, by the terminal, the infrared signal to the to-be-remotely-controlled device according to the selected infrared code in order to establish a pairing with the to-be-remotely-controlled device includes after sending the infrared signal, sensing, by the terminal using a sensor of the terminal, a status change of the to-be-remotely-controlled device that occurs after the to-be-remotely-controlled device receives the infrared signal, and determining, by the terminal according to the status change of the to-be-remotely-controlled device that is sensed by the sensor, whether the terminal successfully establishes a pairing with the to-be-remotely-controlled device.

Optionally, determining, by the terminal according to the status change of the to-be-remotely-controlled device that is sensed by the sensor, whether the terminal successfully establishes a pairing with the to-be-remotely-controlled device includes determining, by the terminal, the status change of the to-be-remotely-controlled device according to the operation sensing information, where the operation sensing information is information obtained by the sensor according to the sensed status change of the to-be-remotely-controlled device that occurs after the to-be-remotely-controlled device receives the infrared signal, and determining, by the terminal, that the terminal successfully establishes a pairing with the to-be-remotely-controlled device when the determined status change of the to-be-remotely-controlled device is consistent with an operation indicated by the infrared signal, or determining, by the terminal, that the terminal fails to establish a pairing with the to-be-remotely-controlled device when the determined status change of the to-be-remotely-controlled device is inconsistent with an operation indicated by the infrared signal.

Optionally, the sensor includes a sound sensor and/or a camera.

The following further illustrates the embodiments of the present disclosure using specific Embodiment 1 to Embodiment 5.

Embodiment 1

In Embodiment 1, the sensor includes a sound sensor, the sound sensor may be a microphone, the to-be-remotely-controlled device is a television, the processor controls the infrared transmitter to send an infrared signal to the television, and an operation indicated by the infrared signal is "power on".

After the transmitter transmits the infrared signal, the sensor senses a change of sound emitted by the television.

In one aspect, if sound has been sensed, the sensor obtains corresponding operation sensing information, for example, sound information used to indicate that sound has been sensed, which may be 1-bit information "1". After receiving the sound information "1" that is used to indicate that sound has been sensed and that is sent by the sensor, the processor may determine that the to-be-remotely-controlled device has performed an operation of "power on", determine that a status change of the to-be-remotely-controlled device is consistent with the operation of "power on" indicated by the infrared signal, and determine that the terminal successfully establishes a pairing with the to-be-remotely-controlled device.

In another aspect, if no sound has been sensed, the sensor may also obtain corresponding operation sensing information, for example, information used to indicate that no sound has been sensed. Different from the sound information "1" used to indicate that sound has been sensed, the information used to indicate that no sound has been sensed may be "0". The processor determines, according to the received information used to indicate that no sound has been sensed, that the to-be-remotely-controlled device has not performed an operation of "power on", determine that a status change of the to-be-remotely-controlled device is inconsistent with the operation of "power on" indicated by the infrared signal, and determine that the terminal fails to establish a pairing with the to-be-remotely-controlled device.

Alternatively, the operation sensing information obtained by the sensor is sound characteristic information of sound sensed by the sensor, for example, a change from no sound to sound, a change from a low volume to a high volume, a change from a high volume to a low volume, or a change from sound to no sound.

If the television has correctly performed the operation of "power on" after receiving the infrared signal, the sensor senses a change from no sound to sound, and obtained operation sensing information includes sound characteristic information used to indicate the change from no sound to sound. The processor determines, according to the sound characteristic information that is used to indicate the change from no sound to sound and that is sent by the sensor, that the television has performed the operation of "power on", which is consistent with the operation indicated by the infrared signal, and determines that the terminal successfully establishes a pairing with the television.

If the television has been powered on before receiving the infrared signal, and the television has incorrectly performed an operation of "volume down" after receiving the infrared signal, the sensor senses a change from a high volume to a low volume, and obtained operation sensing information includes sound characteristic information used to indicate the change from a high volume to a low volume. The processor determines, according to the sound characteristic information that is used to indicate the change from a high volume to a low volume and that is sent by the sensor, that the television has performed the operation of "volume down", which is inconsistent with the operation indicated by the infrared signal, and determines that the terminal fails to establish a pairing with the television.

Embodiment 2

In Embodiment 2, the sensor includes a camera, the to-be-remotely-controlled device is an air conditioner, the processor controls the infrared transmitter to send an infrared signal to the air conditioner, and an operation indicated by the infrared signal is "power on".

After the transmitter emits the infrared signal, the sensor senses a status change of an air deflector of the air conditioner.

In one aspect, if the camera that serves as the sensor has captured a change of the air deflector of the air conditioner from closed to open, the camera obtains corresponding operation sensing information, for example, information used to indicate that the change of the air deflector from closed to open has been captured, which may be 1-bit information "1". After receiving the information "1" that is used to indicate the change of the air deflector from closed to open and that is sent by the sensor, the processor may determine that the air conditioner that serves as the to-be-remotely-controlled device has performed an operation of "power on", determine that the status change of the to-be-remotely-controlled device is consistent with the operation of "power on" indicated by the infrared signal, and determine that the terminal successfully establishes a pairing with the to-be-remotely-controlled device.

In another aspect, if the camera that serves as the sensor has not captured a change of the air deflector of the air conditioner from closed to open, for example, the air deflector of the air conditioner keeps stationary, the sensor may also obtain corresponding operation sensing information, for example, information used to indicate that the change of the air deflector of the air conditioner from closed to open has not been captured. Different from the information "1" that is used to indicate that the change of the air deflector from closed to open has been captured, the information used to indicate that the change of the air deflector of the air conditioner from closed to open has not been captured may be "0". The processor determines, according to the received information used to indicate that the change of the air deflector of the air conditioner from closed to open has not been captured, that the air conditioner that serves as the to-be-remotely-controlled device has not performed an operation of "power on", determine that the status change of the to-be-remotely-controlled device is inconsistent with the operation of "power on" indicated by the infrared signal, and determine that the terminal fails to establish a pairing with the to-be-remotely-controlled device.

Embodiment 3

In Embodiment 3, the sensor includes a sound sensor and a camera, the to-be-remotely-controlled device is a television, the processor controls the infrared transmitter to send an infrared signal to the television, and an operation indicated by the infrared signal is "power on".

After the transmitter emits the infrared signal, the sound sensor in the sensor senses sound emitted by the television, obtains corresponding first operation sensing information, and sends the obtained first operation sensing information to the processor. For a method for obtaining the first operation sensing information, reference may be made to Embodiment 1, and details are not described herein again.

After the transmitter emits the infrared signal, the camera in the sensor photographs a screen of the television, senses a lightness change of the screen of the television, obtains corresponding second operation sensing information according to a photographing result, and sends the obtained second operation sensing information to the processor.

Further, if a change of the screen of the television from dark to bright has been captured, the camera obtains corresponding second operation sensing information, for example, information used to indicate that the change of the screen from dark to bright has been captured, which may be 1-bit information "1". If a change of the screen of the television from dark to bright has not been captured, for example, the screen of the television keeps dark, the camera obtains corresponding second operation sensing information, for example, information used to indicate that the change of the screen from dark to bright has not been captured. Different from the information "1" used to indicate that the change of the screen from dark to bright has been captured, the information used to indicate that the change of the screen from dark to bright has not been captured may be "0".

The processor comprehensively determines, according to the first operation sensing information received from the sound sensor and the second operation sensing information received from the camera, an operation performed by the television.

For example, according to a relatively strict determining criterion, the processor may determine, under a condition in which the first operation sensing information and the second operation sensing information both indicate the change of the screen from dark to bright, that the television has performed the operation of "power on", and determine, under a condition in which either or neither of the first operation sensing information and the second operation sensing information indicates the change of the screen from dark to bright, that the television has not performed the operation of "power on".

Alternatively, according to a relatively lenient determining criterion, the processor may determine, under a condition in which either or both of the first operation sensing information and the second operation sensing information indicates the change of the screen from dark to bright, that the television has performed the operation of "power on", and determine, under a condition in which neither the first operation sensing information nor the second operation sensing information indicates the change of the screen from dark to bright, that the television has not performed the operation of "power on".

If the processor determines that the television has performed the operation of "power on", the processor determines that the status change of the television is consistent with the operation of "power on" indicated by the infrared signal, and determines that the terminal successfully establishes a pairing with the television, otherwise, determines that the terminal fails to establish a pairing with the television.

A solution in which a terminal automatically establishes a pairing with a to-be-remotely-controlled device in the embodiments of the present disclosure is illustrated below using Embodiment 4 and Embodiment 5.

Embodiment 4

Figure 5:
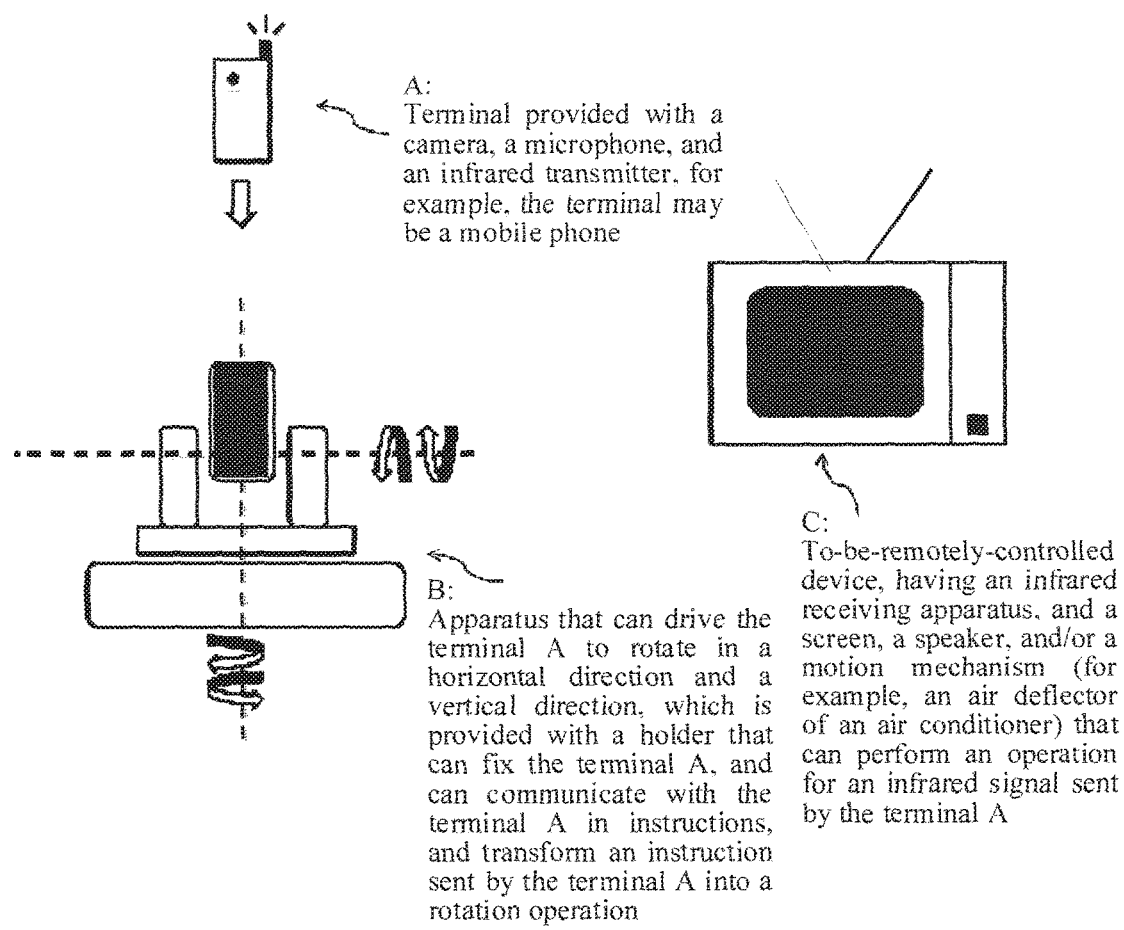
FIG. 5 is a schematic diagram of pairing between a terminal having an infrared remote control function and a to-be-remotely-controlled device according to Embodiment 4 of the present disclosure.

FIG. 5 is a schematic diagram of pairing between a terminal having an infrared remote control function and a to-be-remotely-controlled device according to Embodiment 1 of the present disclosure. As shown in FIG. 5, a terminal A is provided with a camera, a microphone, and an infrared transmitter, and the terminal A may be a mobile phone.

The terminal A may be engaged with a holder that is in the rotation apparatus B and that is configured to fix the terminal A.

The rotation apparatus B may communicate with the terminal A in instructions, and transform an instruction sent by the terminal A into a rotation operation in order to drive the terminal A to rotate in a horizontal direction and a vertical direction.

In a rotation process, the terminal A determines spatial angle coordinates of each surrounding to-be-remotely-controlled device C, and instructs, using an instruction, the rotation apparatus B to point the terminal A to the determined spatial angle coordinates of the to-be-remotely-controlled device C.

After rotating to a direction of the spatial angle coordinates of the to-be-remotely-controlled device C, the terminal A sends an infrared signal to the to-be-remotely-controlled device C using the infrared transmitter, and senses a status change of the to-be-remotely-controlled device C using a sensor such as the camera or the microphone of the terminal A.

When the to-be-remotely-controlled device C receives the infrared signal sent by the terminal A, if the to-be-remotely-controlled device C can correctly respond, the to-be-remotely-controlled device C performs an operation indicated by the infrared signal. For example, if the infrared signal indicates power on, and the to-be-remotely-controlled device C is a television, in a case in which the to-be-remotely-controlled device C correctly responds, a screen of the to-be-remotely-controlled device C changes from dark to bright. The camera of the terminal A captures the change of the screen of the to-be-remotely-controlled device C from dark to bright, and the terminal A determines that the terminal A successfully establishes a pairing with the to-be-remotely-controlled device C.

Embodiment 5

Figure 6:
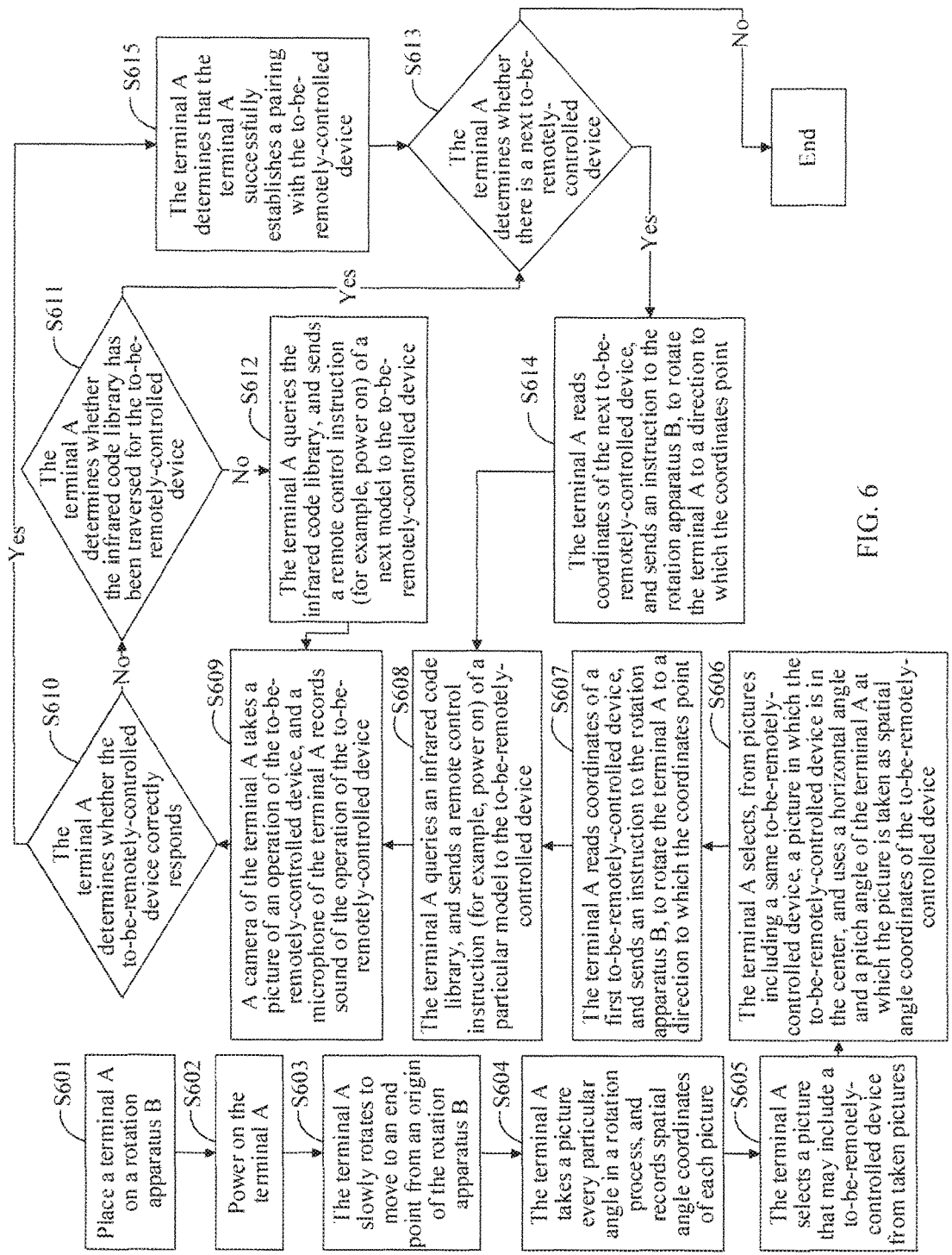
FIG. 6 is a flowchart of a method for pairing between a terminal having an infrared remote control function and a to-be-remotely-controlled device according to Embodiment 5 of the present disclosure.

FIG. 6 is a flowchart of pairing between a terminal having an infrared remote control function and a to-be-remotely-controlled device according to Embodiment 5 of the present disclosure. As shown in FIG. 6, a process includes the following steps.

Step S601: Place a terminal A on a rotation apparatus B.

Step S602: Power on the terminal A.

Step S603: The terminal A slowly rotates to move to an end point from an origin of the rotation apparatus B.

Step S604: The terminal A takes a picture every particular angle in a rotation process, and records spatial angle coordinates of each picture.

Step S605: The terminal A selects a picture that may include a to-be-remotely-controlled device from taken pictures.

Step S606: The terminal A selects, from pictures including a same to-be-remotely-controlled device, a picture in which the to-be-remotely-controlled device is in the center, and uses a horizontal angle and a pitch angle of the terminal A at which the picture is taken as spatial angle coordinates of the to-be-remotely-controlled device.

Step S607: The terminal A reads coordinates of a first to-be-remotely-controlled device, and sends an instruction to the rotation apparatus B, to rotate the terminal A to a direction to which the coordinates point.

Step S608: The terminal A queries an infrared code library, and sends a remote control instruction (for example, power on) of a particular model to the to-be-remotely-controlled device.

Step S609: A camera of the terminal A takes a picture of an operation of the to-be-remotely-controlled device, and a microphone of the terminal A records sound of the operation of the to-be-remotely-controlled device.

Step S610: The terminal A determines whether the to-be-remotely-controlled device correctly responds. Perform step S615 if the to-be-remotely-controlled device correctly responds. Otherwise, perform step S611.

Step S611: The terminal A determines whether the infrared code library has been traversed for the to-be-remotely-controlled device. Perform step S613 if the infrared code library has been traversed for the to-be-remotely-controlled device. Otherwise, perform step S612.

Step S612: The terminal A queries the infrared code library, and sends a remote control instruction (for example, power on) of a next model to the to-be-remotely-controlled device. Then perform step S609.

Step S613: The terminal A determines whether there is a next to-be-remotely-controlled device. Perform step S614 if there is the next to-be-remotely-controlled device. Otherwise, end the process.

Step S614: The terminal A reads coordinates of the next to-be-remotely-controlled device, and sends an instruction to the rotation apparatus B, to rotate the terminal A to a direction to which the coordinates point.

Step S615: The terminal A determines that the terminal A successfully establishes a pairing with the to-be-remotely-controlled device. Then perform step S613.

In conclusion, the embodiments of the present disclosure provide a terminal having an infrared remote control function and a pairing method for infrared remote control. After sending an infrared signal to a to-be-remotely-controlled device, the terminal senses an operation of the to-be-remotely-controlled device using a sensor built in or connected to the terminal, and the terminal determines, according to a sensed status change of the to-be-remotely-controlled device, whether the terminal successfully establishes a pairing with the to-be-remotely-controlled device. A solution in which a terminal automatically establishes a pairing with a to-be-remotely-controlled device is provided, and an automation degree of a pairing process during intelligent remote control is improved.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A terminal having an infrared remote control function, comprising:
a memory configured to store an infrared code library;
a processor coupled to the memory and configured to
select an infrared code from the infrared code library;

an infrared transmitter coupled to the processor and configured to send an infrared signal to a to-be-remotely-controlled device according to the infrared code selected by the processor; and a sensor coupled to the processor and configured to:
sense a status change of the to-be-remotely-controlled device that occurs after the to-be-remotely-controlled device receives the infrared signal; and
obtain operation sensing information of the to-be-remotely-controlled device, the processor being further configured to:
determine, according to the status change of the to-be-remotely-controlled device, whether the terminal establishes a pairing with the to-be-remotely-controlled device;
receive the operation sensing information from the sensor;
determine the status change of the to-be-remotely-controlled device according to the operation sensing information;
determine that the terminal establishes the pairing with the to-be-remotely-controlled device when the status change determined is consistent with an operation indicated by the infrared signal; and
determine that the terminal fails to establish the pairing with the to-be-remotely-controlled device when the status change determined is inconsistent with the operation indicated by the infrared signal.

2. The terminal of claim 1, further comprising an apparatus coupled to the processor, the apparatus including a base and two axles and configured to drive the terminal to rotate in a horizontal direction and a vertical direction under control of the processor, and the processor is further configured to:
determine spatial angle coordinates of the to-be-remotely-controlled device relative to the terminal before the infrared transmitter emits the infrared signal to the to-be-remotely-controlled device;
control the apparatus to rotate the terminal according to the determined spatial angle coordinates such that the infrared signal from the terminal points at the to-be-remotely-controlled device; and
control the infrared transmitter to send the infrared signal to the to-be-remotely-controlled device according to the infrared code selected by the processor after the apparatus rotates the terminal such that the infrared signal from the terminal points at the to-be-remotely-controlled device.

3. A terminal having an infrared remote control function, comprising:
a processor;
an infrared transmitter coupled to the processor; and
an apparatus coupled to the processor and including a base and two axles, the apparatus being configured to drive the terminal to rotate in a horizontal direction and a vertical direction under control of the processor, the infrared transmitter being configured to emit an infrared signal to a to-be-remotely-controlled device under control of the processor, the processor being configured to:
determine spatial angle coordinates of each to-be-remotely-controlled device among to-be-remotely-controlled devices surrounding the terminal relative to the terminal when the apparatus is controlled to rotate the terminal;
control, for each determined set of spatial angle coordinates, the apparatus to rotate the terminal according to the determined set of spatial angle coordinates such that the infrared signal from the terminal points at a to-be-remotely-controlled device at the determined set of spatial angle coordinates; and
control the infrared transmitter to send the infrared signal to the to-be-remotely-controlled device such that the terminal establishes a pairing with the to-be-remotely-controlled device.

4. The terminal of claim 3, further comprising a sensor coupled to the processor, the sensor being configured to sense an operation of an object surrounding the terminal, and after determining each of the determined set of spatial angle coordinates, the processor being further configured to:
control the sensor to sense a status change of the to-be-remotely-controlled device that occurs after the to-be-remotely-controlled device receives the infrared signal; and
determine, according to the status change of the to-be-remotely-controlled device sensed by the sensor, whether the terminal establishes the pairing with the to-be-remotely-controlled device.

5. A pairing method for infrared remote control of a terminal having an infrared remote control function, comprising:
selecting, by the terminal, an infrared code from an infrared code library stored in the terminal;
sending, by the terminal, an infrared signal to a to-be-remotely-controlled device according to the infrared code selected;
sensing, by the terminal using a sensor of the terminal, a status change of the to-be-remotely-controlled device that occurs after the to-be-remotely-controlled device receives the infrared signal; and
determining, by the terminal according to the status change of the to-be-remotely-controlled device-sensed, whether the terminal establishes a pairing with the to-be-remotely-controlled device;
determining, by the terminal, the status change of the to-be-remotely-controlled device according to operation sensing information, the operation sensing information being information obtained by the sensor according to the status change of the to-be-remotely-controlled device sensed;
determining, by the terminal, that the terminal establishes the pairing with the to-be-remotely-controlled device when the status change determined is consistent with an operation indicated by the infrared signal; and
determining, by the terminal, that the terminal fails to establish the pairing with the to-be-remotely-controlled device when the status change determined is inconsistent with the operation indicated by the infrared signal.

6. The method of claim 5, wherein the terminal comprises an apparatus including a base and two axles, the apparatus being configured to drive the terminal to rotate in a horizontal direction and a vertical direction, before selecting the infrared code, the method further comprising determining, by the terminal, spatial angle coordinates of the to-be-remotely-controlled device relative to the terminal before selecting the infrared code, and sending the infrared signal to the to-be-remotely-controlled device comprises controlling, by the terminal, the apparatus to rotate the terminal according to the determined spatial angle coordinates such that the infrared signal from the terminal points at the to-be-remotely-controlled device.

7. A pairing method for infrared remote control of a terminal having an infrared remote control function, wherein the terminal comprises an apparatus including a base and two axles, the apparatus being configured to drive the terminal to rotate in a horizontal direction and a vertical direction, the method comprising:
- determining, by the terminal, spatial angle coordinates of each to-be-remotely-controlled device among to-be-remotely-controlled devices surrounding the terminal relative to the terminal when the apparatus is controlled to rotate the terminal;
- controlling, by the terminal for each determined set of spatial angle coordinates, the apparatus to rotate the terminal according to the determined set of spatial angle coordinates such that an infrared signal from the terminal points at a to-be-remotely-controlled device at the determined set of spatial angle coordinates; and
- sending the infrared signal to the to-be-remotely-controlled device at the spatial angle coordinates in order to establish a pairing with the to-be-remotely-controlled device.

8. The method of claim 7, further comprising:
- sensing, by the terminal using a sensor of the terminal, a status change of the to-be-remotely-controlled device that occurs after the to-be-remotely-controlled device receives the infrared signal; and
- determining, by the terminal according to the status change of the to-be-remotely-controlled device sensed by the sensor, whether the terminal establishes the pairing with the to-be-remotely-controlled device.

* * * * *

UNITED STATES PATENT AND TRADEMARK OFFICE
CERTIFICATE OF CORRECTION

PATENT NO. : 10,304,326 B2
APPLICATION NO. : 15/535253
DATED : May 28, 2019
INVENTOR(S) : Jinhua Zhou et al.

Page 1 of 1

It is certified that error appears in the above-identified patent and that said Letters Patent is hereby corrected as shown below:

On the Title Page

Page 2, Second Column, Lines 5-6, should read:
Machine Translation and Abstract of Japanese Publication No. JPH09224293, August 26, 1997, 24 pages.

Signed and Sealed this
Thirtieth Day of July, 2019

Andrei Iancu
*Director of the United States Patent and Trademark Office*